(12) United States Patent
Sugihara et al.

(10) Patent No.: US 11,216,118 B2
(45) Date of Patent: Jan. 4, 2022

(54) IMAGING APPARATUS, IMAGING METHOD, AND PROGRAM

(71) Applicant: FUJIFILM Corporation, Tokyo (JP)

(72) Inventors: Yuki Sugihara, Saitama (JP); Masaru Kobayashi, Saitama (JP); Kazuki Ishida, Saitama (JP); Masahiko Miyata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/106,490

(22) Filed: Nov. 30, 2020

(65) Prior Publication Data

US 2021/0081074 A1 Mar. 18, 2021

Related U.S. Application Data

(63) Continuation of application No. PCT/JP2019/021101, filed on May 28, 2019.

(30) Foreign Application Priority Data

Jun. 27, 2018 (JP) .............................. JP2018-122043

(51) Int. Cl.
  *G06F 3/041* (2006.01)
  *G06F 3/042* (2006.01)
(52) U.S. Cl.
  CPC .......... *G06F 3/0425* (2013.01); *G06F 3/0412* (2013.01); *G06F 3/0414* (2013.01)
(58) Field of Classification Search
  CPC .... G06F 3/0412; G06F 3/0414; G06F 3/0425; G06F 3/0481; G06F 3/0488;
  (Continued)

(56) References Cited

U.S. PATENT DOCUMENTS

2009/0256817 A1* 10/2009 Perlin ................... G06F 3/0237
                                                                345/174
2016/0011720 A1*  1/2016 Walther .............. G06F 3/04847
                                                                345/173
(Continued)

FOREIGN PATENT DOCUMENTS

CN         103197770 A      7/2013
CN         105824361 A      8/2016
(Continued)

OTHER PUBLICATIONS

International Search Report issued in PCT/JP2019/021101; dated Aug. 13, 2019.
(Continued)

*Primary Examiner* — Ryan A Lubit
(74) *Attorney, Agent, or Firm* — Studebaker & Brackett PC

(57) ABSTRACT

Provided are an imaging apparatus, an imaging method, and a program capable of accurately and simply controlling a movement sensitivity of an index displayed on a finder monitor to a sensitivity desired by a user by using a touch panel installed on a rear monitor. The imaging apparatus (10) has a finder that includes the finder monitor (13), the touch panel (31) that receives a swipe operation for moving the index, and an image processing unit (24). The image processing unit (24) includes a sensitivity setting unit that sets a first sensitivity for coarsely moving the index by the swipe operation or a second sensitivity for finely moving the index by detecting a contact operation to the touch panel in the swipe operation, and a movement control unit that moves the index on the basis of the swipe operation on the touch panel and the sensitivity set by the sensitivity setting unit.

13 Claims, 16 Drawing Sheets

(58) Field of Classification Search
CPC ............ G06F 3/04883; G06F 3/04886; G06F 2203/04803; G03B 13/02; G03B 17/00; G03B 17/18; G03B 17/20; H04N 5/232; H04N 5/23216
See application file for complete search history.

(56) References Cited

U.S. PATENT DOCUMENTS

| | | | |
|---|---|---|---|
| 2017/0060326 A1* | 3/2017 | Kim | G06F 3/0412 |
| 2018/0013973 A1* | 1/2018 | Furuhata | H04N 21/42204 |
| 2018/0063418 A1* | 3/2018 | Oyama | G06F 3/0488 |
| 2018/0220062 A1 | 8/2018 | Funatsu | |
| 2019/0034147 A1* | 1/2019 | Koki | G06F 3/0488 |
| 2019/0158761 A1 | 5/2019 | Sasai | |
| 2020/0007750 A1* | 1/2020 | Ueno | G06F 3/0416 |
| 2020/0257445 A1* | 8/2020 | Rui | G06F 3/0416 |

FOREIGN PATENT DOCUMENTS

| | | |
|---|---|---|
| CN | 106980438 A | 7/2017 |
| CN | 107797714 A | 3/2018 |
| JP | 2010-160581 A | 7/2010 |
| JP | 2012-203143 A | 10/2012 |
| JP | 2017-174363 A | 9/2017 |
| JP | 2018-013745 A | 1/2018 |
| JP | 2018-036802 A | 3/2018 |
| JP | 2018 085570 A | 5/2018 |
| JP | 2018-125612 A | 8/2018 |
| WO | 2016/147697 A1 | 9/2016 |

OTHER PUBLICATIONS

International Preliminary Report on Patentability issued in PCT/JP2019/021101; completed Mar. 6, 2020.
An Office Action; "Notice of Reasons for Refusal," mailed by the Japanese Patent Office dated Jan. 12, 2021, which corresponds to Japanese Patent Application No. 2020-527303 and is related to U.S. Appl. No. 17/106,490 with English language translation.
An Office Action issued by the State Intellectual Property Office of the People's Republic of China dated Sep. 30, 2021, which corresponds to Chinese Patent Application No. CN 201980042597.7.

* cited by examiner

IMAGING APPARATUS, IMAGING METHOD, AND PROGRAM

CROSS-REFERENCE TO RELATED APPLICATIONS

The present application is a Continuation of PCT International Application No. PCT/JP2019/021101 filed on May 28, 2019 claiming priority under 35 U.S.C. § 119(a) to Japanese Patent Application No. 2018-122043 filed on Jun. 27, 2018. Each of the above applications is hereby expressly incorporated by reference, in its entirety, into the present application.

BACKGROUND OF THE INVENTION

1. Field of the Invention

The present invention relates to an imaging apparatus, an imaging method, and a program, and particularly relates to a technique of an imaging apparatus comprising a touch panel.

2. Description of the Related Art

In recent years, a touch panel may be installed on a rear monitor of a body of a digital camera (imaging apparatus). A user can perform operation of various digital cameras by touching the rear monitor with a finger.

For example, JP2012-203143A discloses a technique of moving a display position of an auto focus (AF) target frame (focus area) in a finder monitor in accordance with the movement of a user finger detected by the touch panel of the rear monitor in a case where the user is looking into the finder. In addition, JP2012-203143A discloses a technique of changing the moving speed of the moving display of the AF target frame according to the moving speed of the movement of the user finger. Specifically, in a case where the moving speed of the user finger is higher than a predetermined speed, the moving display is moved at a high speed in accordance with the moving direction of the finger (increase a moving width of a position of the moving display per unit time), and in a case where the moving speed of the user finger is not higher than a predetermined speed, the moving display is moved at a low speed in accordance with the moving direction of the finger (decrease a moving width of a position of the moving display per unit time).

For example, JP2018-013745A discloses a technique for easily moving a long distance of the AF target frame in a case where a user is looking into the finder. Specifically, in the technique disclosed in JP2018-013745A, in a case where a double-tap operation (operations that do not include touch position movement) is performed, the AF target frame is displayed at a position where the double-tap operation is performed without displaying a moving process of the AF target frame on a display unit.

SUMMARY OF THE INVENTION

It is desired to control the moving speed of the index by moving the index at a high speed or moving the index at a low speed in a case where the index displayed on the finder is moved in conjunction with the touch of the touch panel of the rear monitor.

For example, in a case where a subject moves quickly up, down, left, and right in the finder, or in a case where the direction of the digital camera is switched from the horizontal position to the vertical position (or from the vertical position to the horizontal position), it is desired to quickly and accurately move the focus area according to the movement of the subject and the switching of the position of the digital camera.

For example, in order to capture an image with a good tempo in an environment of a mixed light source of various color temperatures, it is desired to quickly and accurately move a position of the white balance shift according to the position of the subject.

JP2012-203143A discloses a technique for changing the moving speed of the moving display of the AF target frame according to the moving speed of the movement of the user finger. However, in the technique disclosed in JP2012-203143A, in order to control the moving speed of the AF target, the user must accurately control the moving speed of the finger, and it is difficult to accurately and simply control the moving speed of the AF target.

In addition, JP2018-013745A does not mention changing the moving speed of the AF target frame.

The present invention has been made in view of such circumstances, and an object of the present invention is to provide an imaging apparatus, an imaging method, and a program which can accurately and simply control a movement sensitivity of an index displayed on a finder monitor to sensitivity desired by a user by using a touch panel installed on a rear monitor.

The imaging apparatus, which is one aspect of the present invention for achieving the above object, comprises a finder that displays a live view image and an index superimposed and displayed on the live view image, the finder displaying the index for indicating an imaging condition or an image processing condition according to a superimposed and displayed position, a touch panel that receives a swipe operation for moving the index, sensitivity setting unit that sets a first sensitivity for coarsely moving the index by the swipe operation or a second sensitivity for finely moving the index by the swipe operation, by detecting a contact operation to the touch panel in the swipe operation, and a movement control unit that moves the index on the basis of the swipe operation on the touch panel and sensitivity set by the sensitivity setting unit.

According to this aspect, the first sensitivity or the second sensitivity is set according to the contact operation to the touch panel, and the index is moved along the swipe operation on the basis of the set sensitivity. Accordingly, the user can accurately and easily move the index with the first sensitivity or the second sensitivity by changing the contact operation on the touch panel.

Preferably, the touch panel has a first region and a second region, and the sensitivity setting unit sets the sensitivity to the first sensitivity in a case where the contact operation is performed in the first region, and sets the sensitivity to the second sensitivity in a case where the contact operation is performed in the second region.

According to this aspect, in a case where the user wants to move the index with the first sensitivity, the user performs the contact operation in the first region, and in a case where the user wants to move the index with the second sensitivity, the user performs the contact operation in the second region. Accordingly, the user can accurately and simply move the index with the first sensitivity or the second sensitivity by selecting a region for performing the contact operation.

Preferably, the imaging apparatus further comprises a posture sensor that detects a posture of the imaging apparatus, and a region setting unit that sets the first region and the second region on the basis of a detection result of the posture sensor.

According to this aspect, since the first region and the second region are set on the basis of the posture of the imaging apparatus, the user can easily select the region for performing the contact operation according to the posture of the imaging apparatus.

Preferably, the touch panel further has a third region that is a non-sensitive region where the swipe operation is not detected.

According to this aspect, a region where the user unintentionally comes into contact with the touch panel is defined as the third region which is a non-sensitive region in which the swipe operation is not detected, so that erroneous operation unintended by the user can be suppressed and accurate movement control of the index can be performed.

Preferably, the sensitivity setting unit sets the sensitivity to the first sensitivity in a case where the contact operation is performed with a first pressing pressure, and sets the sensitivity to the second sensitivity in a case where the contact operation is performed with a second pressing pressure.

According to this aspect, in a case where the user wants to move the index with the first sensitivity, the user performs the contact operation with the first pressing pressure, and in a case where the user wants to move the index with the second sensitivity, the user performs the contact operation with the second pressing pressure. Accordingly, the user can accurately and simply move the index with the first sensitivity or the second sensitivity by selecting the pressing pressure of the contact operation.

Preferably, the sensitivity setting unit sets the sensitivity to the first sensitivity in a case where the contact operation is performed with a first contact area, and sets the sensitivity to the second sensitivity in a case where the contact operation is performed with a second contact area.

According to this aspect, in a case where the user wants to move the index with the first sensitivity, the user performs the contact operation with the first contact area, and in a case where the user wants to move the index with the second sensitivity, the user performs the contact operation with the second contact area. Accordingly, the user can accurately and simply move the index with the first sensitivity or the second sensitivity by selecting the contact area of the contact operation.

Preferably, the sensitivity setting unit sets the sensitivity to the first sensitivity in a case where the contact operation is performed with a first number of fingers, and sets the sensitivity to the second sensitivity in a case where the contact operation is performed with a second number of fingers.

According to this aspect, in a case where the user wants to move the index with the first sensitivity, the user performs the contact operation with the first number of fingers, and in a case where the user wants to move the index with the second sensitivity, the user performs the contact operation with the second number of fingers. Accordingly, the user can accurately and simply move the index with the first sensitivity or the second sensitivity by selecting the number of fingers of the contact operation.

Preferably, the imaging apparatus further comprises a forced sensitivity setting unit that setting the sensitivity forcibly, in which the touch panel detects a start point and an end point of the swipe operation, and the forced sensitivity setting unit forcibly switches a reception setting of the first sensitivity and a reception setting of the second sensitivity in a case where a distance between the start point and the end point is a threshold value or less.

According to this aspect, in a case where the distance between the start point and the end point is equal to or less than the threshold value, the forced sensitivity setting unit forcibly switches the reception setting of the first sensitivity and the reception setting of the second sensitivity. Accordingly, in this aspect, in a case where the index is moved at sensitivity unintended by the user, the sensitivity can be easily switched.

Preferably, the forced sensitivity setting unit forcibly switches the first sensitivity to the second sensitivity in a case where the distance between the start point and the end point is a first threshold value or less in the movement of the index at the first sensitivity, and forcibly switches the second sensitivity to the first sensitivity in a case where the distance between the start point and the end point is a second threshold value or less in the movement of the index at the second sensitivity.

According to this aspect, a predetermined threshold value is set for the distance between the start point and the end point according to the set sensitivity of the index, and the forced sensitivity setting unit switches the sensitivity on the basis of this threshold value. Accordingly, an appropriate sensitivity can be switched according to the moving sensitivity of the index.

Preferably, the index shows a position of the focus area.

According to this aspect, the user can move the position of the focus area according to an intended sensitivity.

Preferably, the index shows an amount of white balance correction.

According to this aspect, the user can change the amount of white balance correction according to the intended sensitivity.

An imaging method according to another aspect of the present invention is an imaging method of an imaging apparatus having a finder that displays a live view image and an index superimposed and displayed on the live view image, the finder displaying the index for indicating an imaging condition or an image processing condition according to a superimposed and displayed position, and a touch panel that receives a swipe operation for moving the index, the imaging method including sensitivity setting step of setting a first sensitivity for coarsely moving the index by the swipe operation or a second sensitivity for finely moving the index by the swipe operation, by detecting a contact operation to the touch panel in the swipe operation, and a movement control step of moving the index on the basis of the swipe operation on the touch panel and sensitivity set by the sensitivity setting unit.

A program according to another aspect of the present invention is a program for causing a computer to execute an imaging process of an imaging apparatus comprising a finder that displays a live view image and an index superimposed and displayed on the live view image, the finder displaying the index for indicating an imaging condition or an image processing condition according to a superimposed and displayed position, and a touch panel that receives a swipe operation for moving the index, the program causing the computer to execute the imaging process including sensitivity setting step of setting a first sensitivity for coarsely moving the index by the swipe operation or a second sensitivity for finely moving the index by the swipe operation, by detecting a contact operation to the touch panel in the swipe operation, and a movement control step of moving the index on the basis of the swipe operation on the touch panel and sensitivity set by the sensitivity setting unit.

According to the present invention, since the first sensitivity or the second sensitivity is set according to the touch operation to the touch panel and the index is moved along the swipe operation on the basis of the set sensitivity, the user can accurately and simply move the index with the first sensitivity or the second sensitivity by changing the touch operation to the touch panel.

DESCRIPTION OF THE PREFERRED EMBODIMENTS

Preferred embodiments of an imaging apparatus, an imaging method, and a program according to the present invention will be described below with reference to the accompanying drawings.

[Imaging Apparatus]

Figure 1:
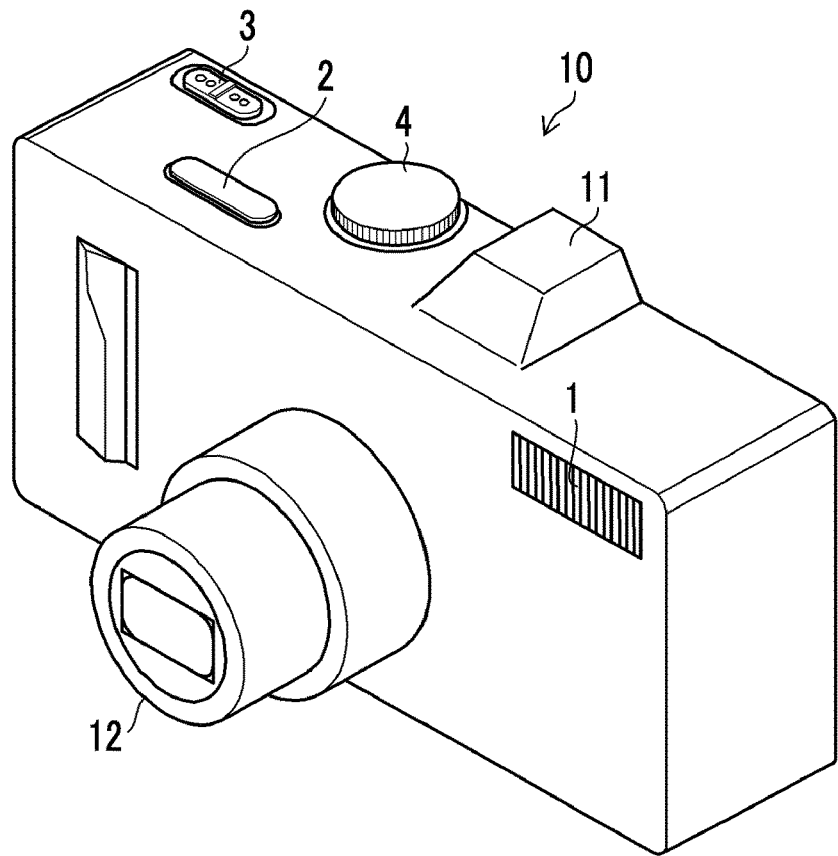
FIG. 1 is a perspective view showing an example of an imaging apparatus.
Figure 2:
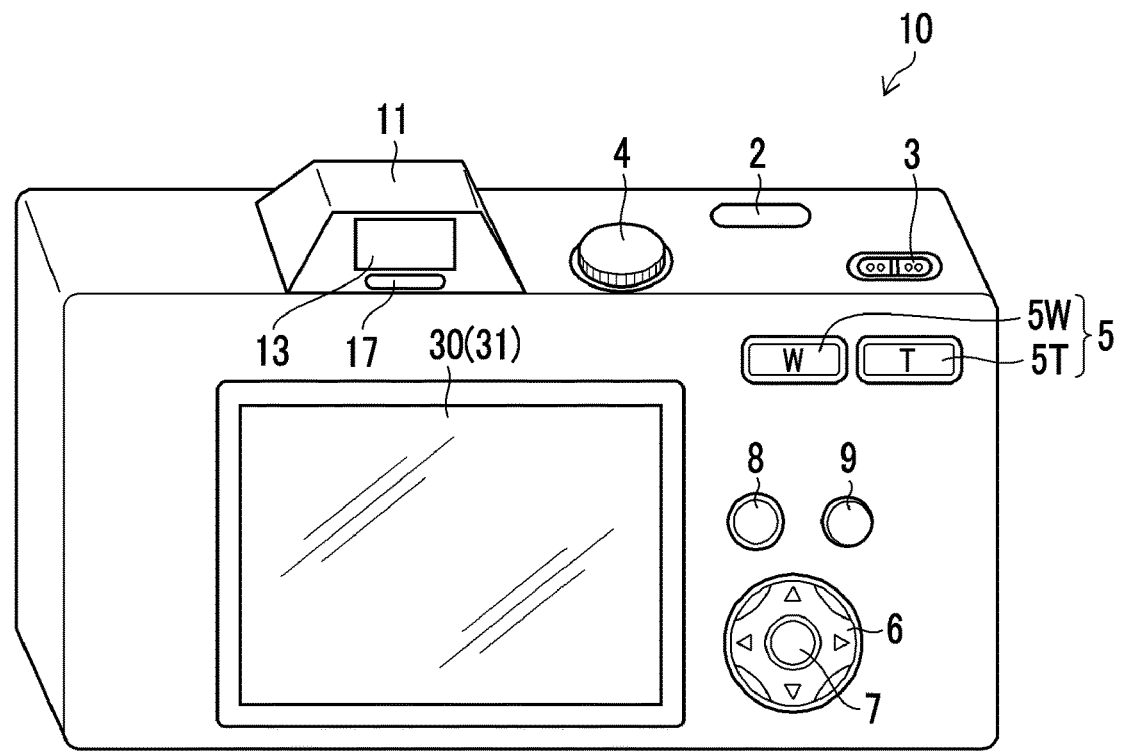
FIG. 2 is a rear view showing an example of an imaging apparatus.

FIGS. 1 and 2 are a perspective view and a rear view showing an example (digital camera) of an imaging apparatus, respectively. An imaging apparatus 10 is a digital camera that receives light that has passed through a lens by an imaging element, converts the light into a digital signal, and records the digital signal in a recording media as image data of a static image or a video image.

As shown in FIG. 1, the imaging apparatus 10 arranges an imaging lens 12, a strobe 1 and the like on a front surface thereof, and a shutter button 2, a power/mode switch 3, a mode dial 4 and the like on an upper surface thereof. On the other hand, as shown in FIG. 2, a rear monitor 30 composed of a liquid crystal (LCD) monitor, a zoom button 5, a cross button 6, a MENU/OK button 7, a play button 8, a BACK button 9, a finder 11, a finder monitor 13 composed of a liquid crystal monitor, an eye sensor 17 and the like are arranged on a rear surface of the camera.

The imaging lens 12 is composed of a retractable zoom lens, and is extended from a camera main body by setting an operation mode of the camera to an imaging mode by the power/mode switch 3. The strobe 1 irradiates the main subject with strobe light.

The shutter button 2 is composed of two-step stroke type switch consisting of so-called "half push" and "full push", and functions as an imaging preparation instruction unit and an image recording instruction unit.

In a case where a static imaging mode is selected as the imaging mode and the shutter button 2 is "half push", the imaging apparatus 10 performs an imaging preparation operation for performing auto focus (AF)/auto exposure (AE) control, and in a case where the shutter button 2 is "full push", the imaging apparatus captures and records a static image.

In addition, in a case where a video imaging mode is selected as the imaging mode and the shutter button 2 is "full push", the imaging apparatus 10 starts recording the video image, and in a case where the shutter button 2 is "full push" again, the imaging apparatus stops the recording and enters a standby state.

The power/mode switch 3 has a function as a power switch for turning on/off the power of the imaging apparatus 10 and a function as a mode switch for setting a mode of the imaging apparatus 10, and is slidably arranged between an "OFF position", a "play position" and an "imaging position". In the imaging apparatus 10, the power is turned on by sliding the power/mode switch 3 to the "play position" or the "imaging position", and the power is turned off by switching to "OFF position". Then, the power/mode switch 3 is slid to be set to a "playback mode" by being set to the "play position", and to be set to be the "imaging mode" by being set to the "imaging position".

The mode dial 4 functions as a mode switching unit that sets the imaging mode of the imaging apparatus 10, and the imaging mode of the imaging apparatus 10 is set to various modes depending on a setting position of the mode dial 4. For example, there are the "static imaging mode" for capturing a static image, the "video imaging mode" for capturing a video image, and the like.

The rear monitor 30 and the finder monitor 13 function as a part of a graphical user interface by displaying a live view image in the imaging mode, displaying the static image or the video image in the playback mode, and displaying a menu screen. In addition, a touch panel 31 (FIG. 3) is integrally installed on the rear monitor 30.

The zoom button 5 functions as a zoom instruction means for instructing zooming, and consists of a tele button 5T for instructing zooming to the telephoto side and a wide button 5W for instructing zooming to the wide angle side. In the imaging apparatus 10, in the imaging mode, a focal length of the imaging lens 12 is changed by operating the tele button 5T and the wide button 5W. In addition, in the playback mode, the tele button 5T and the wide button 5W are operated to enlarge or reduce the image being played.

The cross button 6 is an operation unit that inputs instructions in four directions, for example, up, down, left, and right, and functions as a button (cursor moving operation means) for selecting an item from a menu screen or instructing selection of various setting items from each menu. Left/right keys function as a frame feed (forward/reverse direction) button in the playback mode.

The MENU/OK button 7 is an operation button having both a function as a menu button for instructing to display a menu on the screen of the rear monitor 30 and a function as an OK button for instructing determination and execution of a selected content.

The play button 8 is a button for switching to the playback mode in which the static image or the video image captured and recorded is displayed on the rear monitor 30.

The BACK button 9 functions as a button for instructing to cancel the input operation or return to the immediately previous operation state.

Although members specific to the above-described buttons/switches are provided, the functions of those buttons/switches can be realized by operating the touch panel 31.

[Internal Configuration of Imaging Apparatus]

Figure 3:
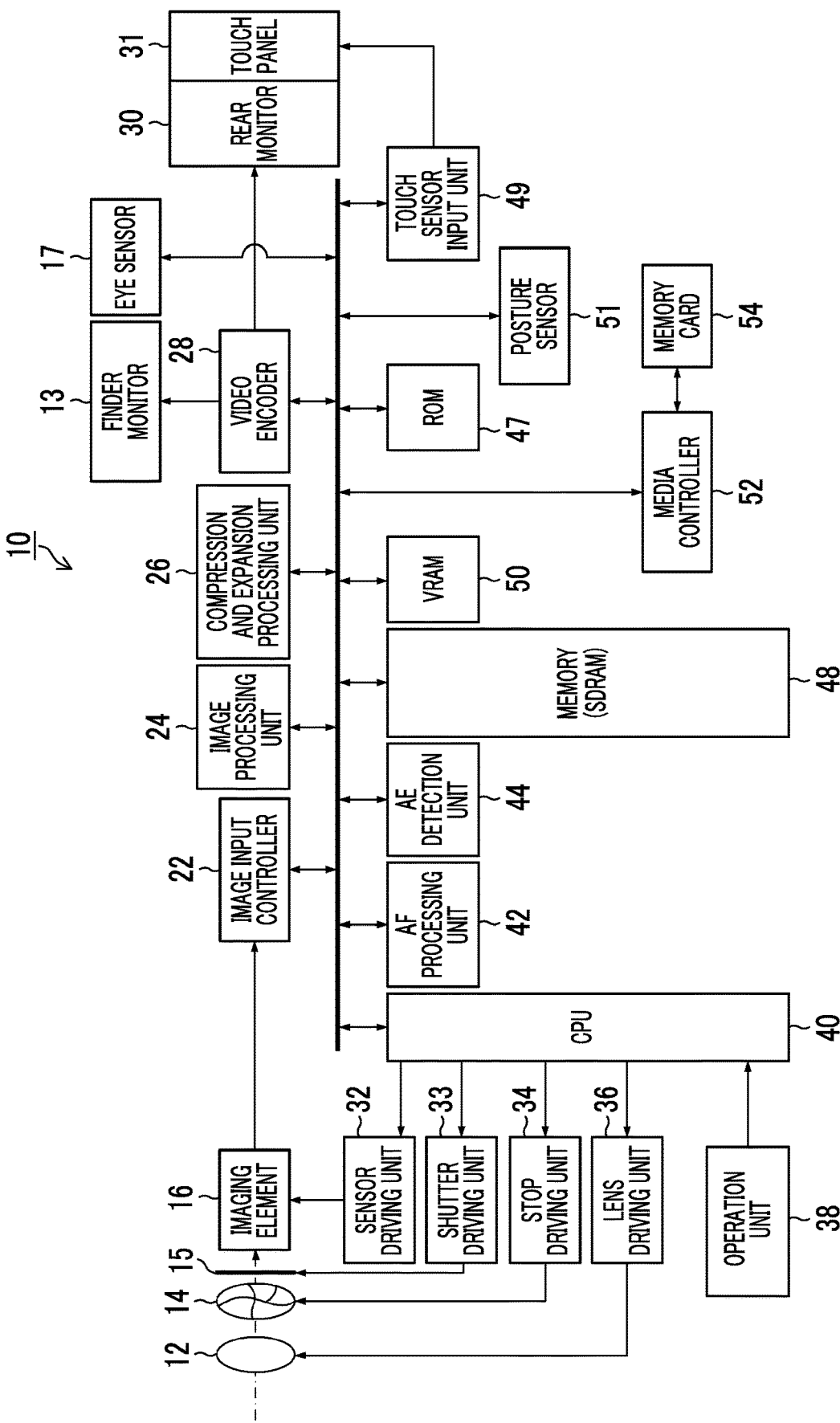
FIG. 3 is a block diagram showing an embodiment of an internal configuration of an imaging apparatus.

FIG. 3 is a block diagram showing an embodiment of an internal configuration of the imaging apparatus 10. The imaging apparatus 10 records a captured image in a memory card 54, and the operation of the entire apparatus is centrally controlled by a central processing unit (CPU) 40.

The imaging apparatus 10 is provided with an operation unit 38 such as the shutter button 2, the power/mode switch 3, the mode dial 4, the tele button 5T, the wide button 5W, the cross button 6, the MENU/OK button 7, the play button 8, the BACK button 9, and the like. Signals from the operation unit 38 are input to the CPU 40, and the CPU 40 controls each circuit of the imaging apparatus 10 on the basis of the input signals, and performs, for example, driving control of the imaging element (image sensor) 16 by a sensor driving unit 32, driving control of a mechanical shutter 15 by a shutter driving unit 33, driving control of a stop 14 by a stop driving unit 34, driving control of the imaging lens 12 by the lens driving unit 36, as well as imaging operation control, image processing control, recording/playing control of image data, display control of the finder monitor 13 and the rear monitor 30.

In a case where the power of the imaging apparatus 10 is turned on by the power/mode switch 3, the power is supplied to each block from a power supply unit (not shown), and driving of the imaging apparatus 10 is started.

The light flux that has passed through the imaging lens 12, the stop 14, the mechanical shutter 15, and the like is imaged on an imaging element 16 which is a complementary metal-oxide semiconductor (CMOS) type color image sensor. It should be noted that the imaging element 16 is not limited to the CMOS type, and may be an XY address type or charge coupled device (CCD) type color image sensor.

In the imaging element 16, a large number of light-receiving elements (photodiode) are two-dimensionally arranged, and a subject image imaged on the light-receiving surface of each photodiode is converted into a signal voltage (or charge) of an amount corresponding to an amount of incidence ray, is converted into a digital signal via an analog/digital (A/D) converter in the imaging element 16, and is output.

An image signal (image data) read from the imaging element 16 at the time of imaging a video image or a static image is temporarily stored in a memory (synchronous dynamic random access memory (SDRAM)) 48 via an image input controller 22, or is taken into an AF processing unit 42, an AE detection unit 44, and the like.

The CPU 40 centrally controls each unit of the imaging apparatus 10 on the basis of the operation by the operation unit 38, but always performs the AF operation and the AE operation during capturing of the live view image (displaying) and the capturing of the video image (recording).

The AF processing unit 42 is a part that performs contrast AF processing or phase difference AF processing. In a case of performing the contrast AF processing, high-frequency components of the image in the AF region in the continuously captured images are extracted, and the high-frequency components are integrated to calculate the AF evaluation value indicating the in-focus state. On the basis of an AF evaluation value calculated by the AF processing unit 42, the CPU 40 performs AF control (contrast AF) by moving the focus lens in the imaging lens 12 to a lens position where the AF evaluation value is maximum.

In a case where the imaging element 16 has a phase difference pixel, the AF processing unit 42 calculates phase difference data (for example, an integrated value of an absolute value of a difference between output data of a pair of phase difference pixels) on the basis of the output data of each of the pair of phase difference pixels in the AF region, and calculates a deviation amount (defocus amount) in the optical axis direction between a focus position of the imaging lens 12 and an imaging surface of the imaging element 16 on the basis of the calculated phase difference data. The CPU 40 performs the AF control (phase difference AF) by moving the focus lens in the imaging lens 12 to a lens position where the defocus amount becomes zero on the basis of the defocus amount calculated by the AF processing unit 42.

The AE detection unit 44 integrates image data (for example, a pixel value of a G pixel of the entire screen) acquired via the image input controller 22, or integrates image data in which a central part of the screen and an edge part are weighted differently (a pixel value of G pixel) and the integrated value is output to the CPU 40. The CPU 40 calculates a brightness of a subject (an imaging exposure value (Ev)) from the integrated value input from the AE detection unit 44. Assuming that the imaging mode is the static imaging mode, the CPU 40 performs the AF control again in a case where the shutter button 2 is pressed at the first stage (half push), calculates the brightness (the imaging Ev value) of the subject in a case where the shutter button 2 is full push, determines an f number of the stop 14 and an exposure time (a shutter speed) by a mechanical shutter 15 according to the program diagram on the basis of the calculated imaging Ev value, and captures (exposure control) the static image.

On the other hand, assuming that the imaging mode is the video imaging mode, in a case where the shutter button 2 is full push, the CPU 40 starts imaging and recording of a video image. At the time of capturing a video image, the mechanical shutter 15 is opened, and the image data is continuously read from the imaging element 16 (for example, 30 frames per second, 60 frames per second as a frame rate). While the phase difference AF is continuously performed, the brightness of the subject is calculated, and the shutter speed (charge accumulation time by a rolling shutter) is controlled by the shutter driving unit 33 and/or the stop 14 is controlled by the stop driving unit 34.

The CPU 40 moves the zoom lens forward and backward in the optical axis direction via the lens driving unit 36 in response to a zoom instruction from the zoom button 5 to change the focal length.

In addition, a ROM 47 is a read only memory (ROM) or an electrically erasable programmable read-only memory (EEPROM) that stores a camera control program, defect information of the imaging element 16, various parameters and tables used for image processing, and the like.

The image processing unit 24 reads unprocessed image data (RAW data) that is acquired via the image input controller 22 at the time of capturing a video image or a static image and temporarily stored in the memory 48. The image processing unit 24 performs offset processing, pixel interpolation processing (interpolation processing for a phase difference detecting pixel, damaged pixel, and the like), white balance correction, gain control processing including sensitivity correction, gamma-correction processing, synchronization processing (also called "demosaicing"), brightness and color difference signal generation processing, edge enhancement processing, color correction, and the like on the read RAW data.

The image data processed by the image processing unit 24, that is, the image data processed as a live view image is input to a video random access memory (VRAM) 50.

The VRAM 50 includes an A region and a B region that record each of image data representing an image for one frame. In the VRAM 50, the image data representing the image for one frame is rewritten in the A region and the B region alternately. The written image data is read from another region, other than the region where the image data is rewritten, of the A region and the B region of the VRAM 50.

The image data read from the VRAM 50 is encoded by a video encoder 28 and output to the finder monitor 13 and the rear monitor 30 provided on a rear surface of a camera. As a result, the live view image showing the subject image is displayed on the finder monitor 13 and the rear monitor 30. It should be noted that the display of the live view image on the finder monitor 13 or the rear monitor 30 is controlled by the detection of the eye sensor 17. In a case where it is detected that a user is looking into the finder monitor 13 by the eye sensor 17, the live view image is displayed on the finder monitor 13, and in a case where it is detected that the user is not looking into the finder monitor 13, the live view image is displayed on the rear monitor 30.

The eye sensor 17 is a sensor that detects whether or not the user is looking into the finder monitor 13. The eye sensor 17 is composed of, for example, an infrared sensor.

The touch panel 31 is provided integrally with the rear monitor 30. The touch panel 31 detects a touch of a user finger 120 as an operation by the user. Here, the touch panel 31 detects contact by various methods such as a resistance film method and a capacitance method.

The touch sensor input unit 49 analyzes a touch position of the user finger 120 on the touch panel 31 and the movement of the user finger 120 from the signal from the touch panel 31, and outputs the analysis result.

The image data processed by the image processing unit 24, that is, the image data processed as a static image or video image for recording (brightness data (Y) and color difference data (Cb), (Cr)) is stored again in the memory 48.

A compression and expansion processing unit 26 performs compression processing on the brightness data (Y) and the color difference data (Cb), (Cr) processed by the image processing unit 24 and stored in the memory 48 at the time of recording a static image or a video image. In a case of the static image, it is compressed in, for example, a joint photographic coding experts group (JPEG) format, and in a case of the video image, it is compressed in, for example, an H.264 format. The compressed image data compressed by the compression and expansion processing unit 26 is recorded in the memory card 54 via a media controller 52.

The compression and expansion processing unit 26 also performs expansion processing on the compressed image data obtained from the memory card 54 via the media controller 52 in the playback mode. The media controller 52 records and reads the compressed image data to and from the memory card 54.

A posture sensor 51 is a sensor that detects the posture of the imaging apparatus 10, and is composed of, for example, a gyro sensor. The posture sensor 51 detects whether the imaging apparatus 10 is in the horizontal position or the vertical position according to the imaging posture of the user. In a case where the imaging apparatus 10 is in the vertical position, the posture sensor 51 can detect whether the finder 13 is in the vertical position on the right side with respect to the imaging direction or the finder 13 is in the vertical position on the left side with respect to the imaging direction.

First Embodiment

Figure 4:
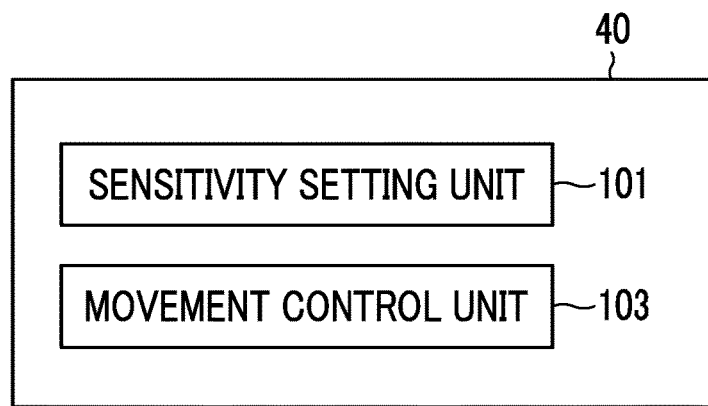
FIG. 4 is a block diagram showing an example of the main functional configuration of a CPU.

FIG. 4 is a block diagram showing an example of the main functional configuration of the CPU 40 of the embodiment.

The CPU 40 of the embodiment has sensitivity setting unit 101 and a movement control unit 103.

The sensitivity setting unit 101 sets the sensitivity in a case of moving the index. The sensitivity setting unit 101 sets the sensitivity of the index that moves according to the swipe operation received on the touch panel 31. Here, the sensitivity is the moving distance of the index according to the moving distance of the swipe operation received on the touch panel 31. In addition, the index is a mark or the like that is superimposed and displayed on the live view image, and it is possible to instruct the imaging condition or the image processing condition according to a superimposed and displayed position. For example, the index shows a focus area. In addition, for example, the index shows the shift amount of the white balance shift.

In a case where the sensitivity is high (the first sensitivity), the moving distance of the index is set longer than the moving distance of the swipe operation, and the moving speed of the index becomes faster (coarse movement). On the other hand, in a case where the sensitivity is low (the second sensitivity), the moving distance of the index is set shorter than the moving distance of the swipe operation, and the moving speed of the index becomes slow (fine movement).

The movement control unit 103 moves the index on the basis of the swipe operation on the touch panel 31 and the sensitivity set by the sensitivity setting unit 101. Specifically, the movement control unit 103 moves the index displayed on the finder monitor 13 in conjunction with the swipe operation, according to the sensitivity determined by the contact operation. In a case where the first sensitivity is set by the contact operation, the index is moved by the first sensitivity in conjunction with the subsequent swipe operation. In addition, in a case where the second sensitivity is set by the contact operation, the index is moved by the second sensitivity in conjunction with the subsequent swipe operation.

An example of the contact operation on the touch panel 31 will be described. In this example, a region is provided on the touch panel 31, and the sensitivity is set according to a region where the contact operation is performed.

Figure 5:
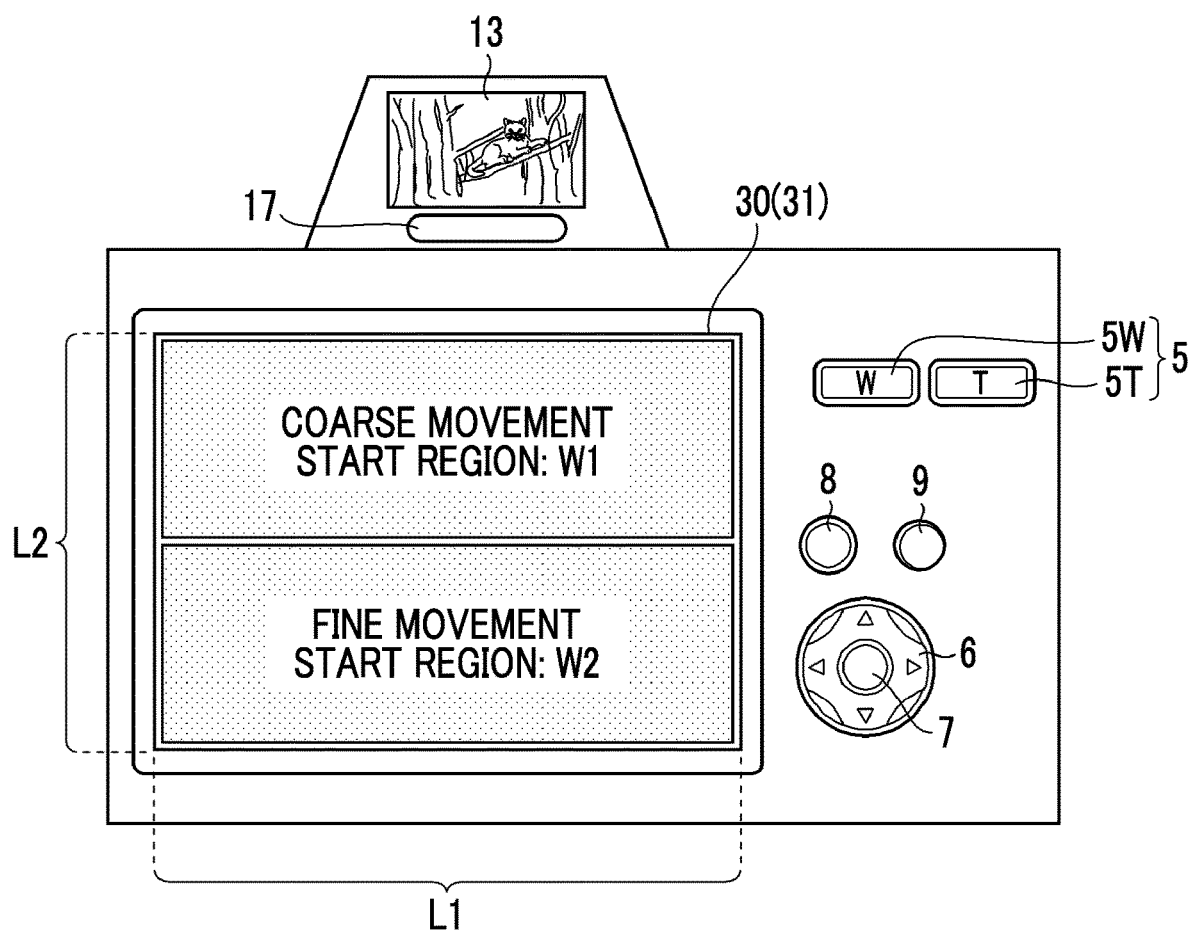
FIG. 5 is a diagram showing an example of a region division of a touch panel.

FIG. 5 is a diagram showing an example of region division of the touch panel 31.

The touch panel 31 is configured with a coarse movement start region (the first region) W1 and a fine movement start region (the second region) W2. The coarse movement start region W1 and the fine movement start region W2 are provided so as to divide a short side L2 of the touch panel 31 into two equal parts.

In a case where the contact operation is performed on the coarse movement start region W1, the index is moved by coarse movement sensitivity. In addition, in a case where the contact operation is performed on the fine movement start region W2, the index is moved by the fine movement sensitivity. The contact operation is an operation of touchdown to an initial touch panel 31 in the first swipe operation, and the swipe operation is an operation of touching the touch panel 31 with the finger 120, and then moving the finger 120 in a state of touching the touch panel 31. The sensitivity setting unit 101 sets the coarse movement sensitivity and the fine movement sensitivity by detecting a contact operation (touchdown to the initial touch panel 31), so that even in a case where the finger 120 contacts different regions in the middle of the swipe operation, the sensitivity is fixed by the sensitivity set at the beginning. Therefore, a change in sensitivity does not occur in the middle of the movement of the index.

<Coarse Movement Sensitivity of Index>

Figure 6:
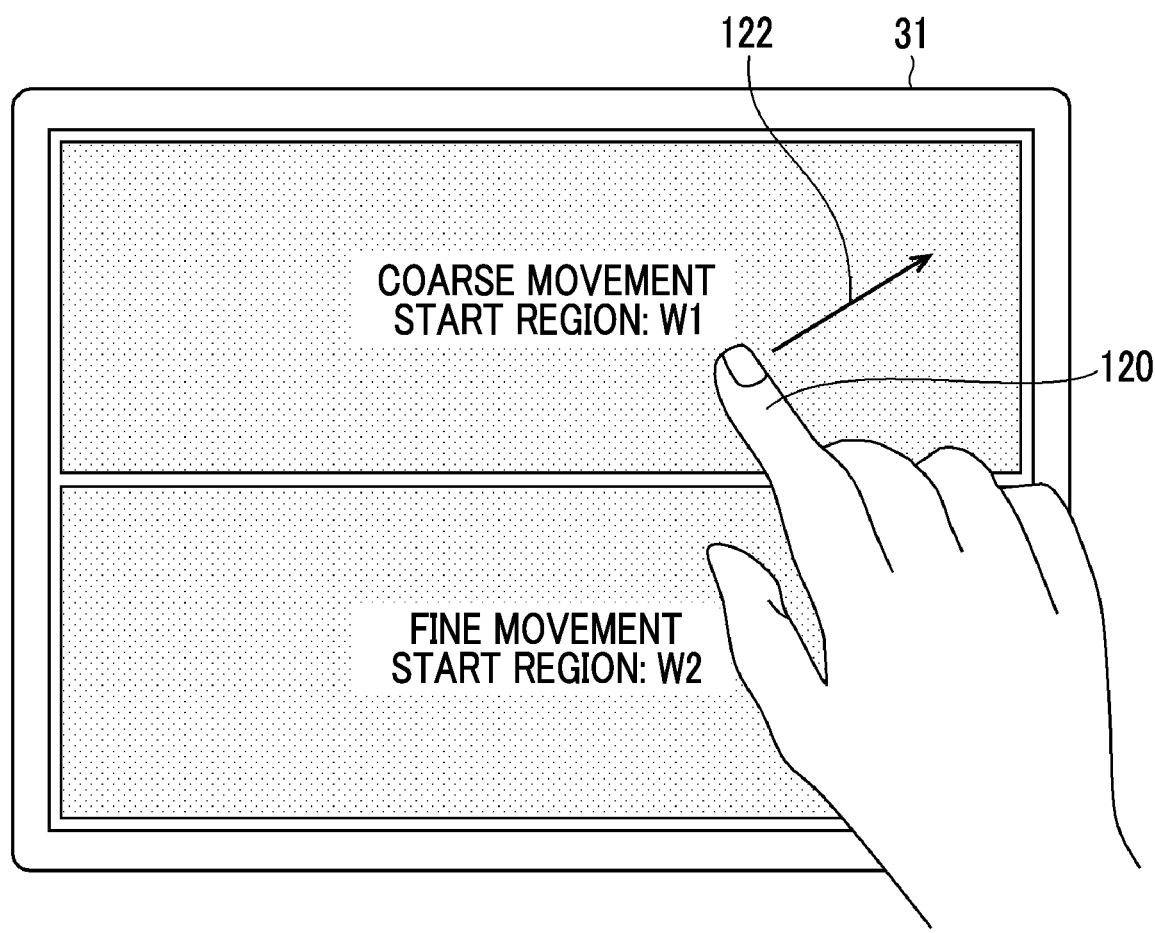
FIG. 6 is a diagram showing a swipe operation on a touch panel.
Figure 7:
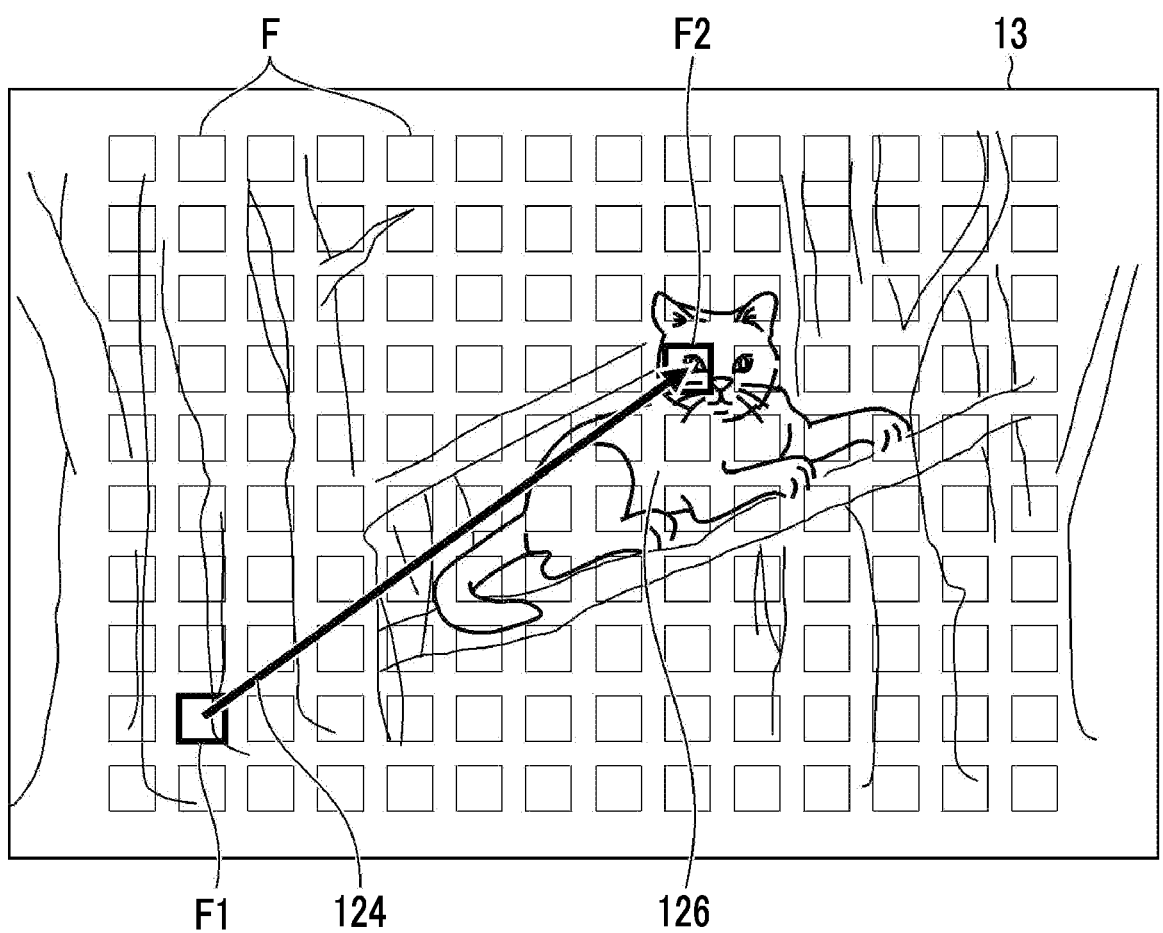
FIG. 7 is a diagram showing movement of a focus area on a finder monitor.

FIG. 6 and FIG. 7 are diagrams showing an example in which the index is moved by the coarse movement sensitivity.

FIG. 6 is a diagram showing the swipe operation on the touch panel 31. In addition, FIG. 7 is a diagram showing movement of the focus area F on the finder monitor 13 in conjunction with the swipe operation shown in FIG. 6. Although a candidate of the focus area F on the finder monitor 13 is displayed in FIG. 7, the candidate of the focus area F may not be displayed on the actual finder monitor 13.

As shown in FIG. 6, the user uses the finger 120 to perform the swipe operation on the touch panel 31. Specifically, the contact operation of the finger 120 is performed in the coarse movement start region W1. Then, the finger 120 performs the swipe operation along an arrow 122. In conjunction with this swipe operation, as shown in FIG. 7, a position of the focus area F, which is an example of the index, moves from F1 to F2 along an arrow 124 in the finder monitor 13. The movement of the focus area F is performed by the coarse movement sensitivity. In a case where the focus area F can be moved with the coarse movement sensitivity in this way, the position of the focus area F can be quickly moved according to the movement of a cat 126, which is a subject, even in a case where the cat 126 is moving quickly.

<Fine Movement of Index>

Figure 8:
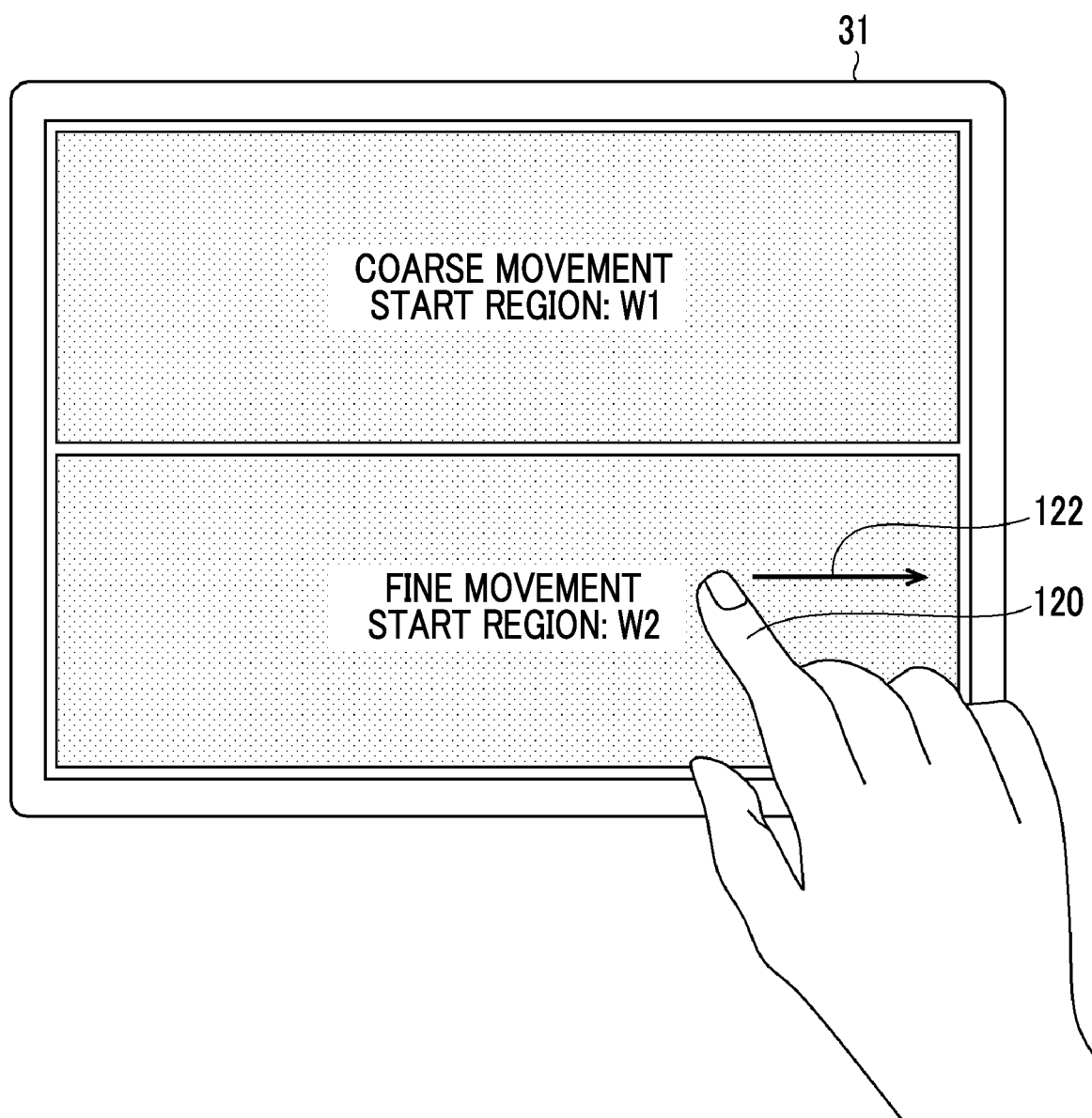
FIG. 8 is a diagram showing a swipe operation on a touch panel.
Figure 9:
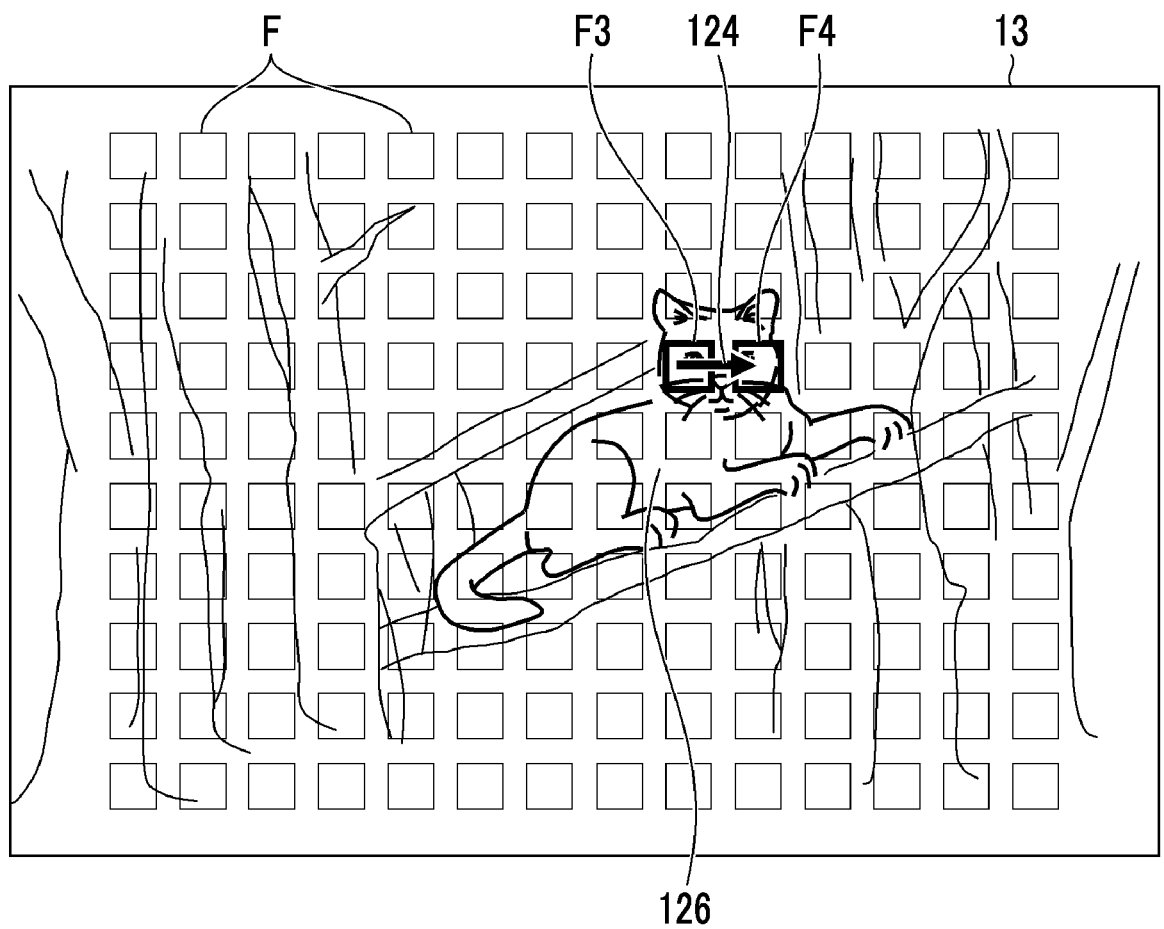
FIG. 9 is a diagram showing movement of a focus area on a finder monitor.

FIG. 8 and FIG. 9 are diagrams showing an example in which the index is moved by the fine movement sensitivity.

FIG. 8 is a diagram showing the swipe operation on the touch panel 31. In addition, FIG. 9 is a diagram showing movement of the focus area F on the finder monitor 13 in conjunction with the swipe operation shown in FIG. 8.

As shown in FIG. 8, the user uses the finger 120 to perform the swipe operation on the touch panel 31. Specifically, in the fine movement start region W2 of the touch panel 31, the contact operation of the finger 120 is performed. Then, the finger 120 performs the swipe operation along the arrow 122. In conjunction with this swipe operation, as shown in FIG. 9, the position of the focus area F moves from F3 to F4 along the arrow 124 in the finder monitor 13. The movement of the focus area F is performed by the fine movement sensitivity. Assuming that the index is moved by the fine movement sensitivity in this way, in a case where the position of the focus area F is accurately adjusted to the face of the cat 126, which is a subject, the user can easily and accurately adjust the position of the focus area F.

Next, an imaging method (imaging process) using the imaging apparatus 10 will be described.

Figure 10:
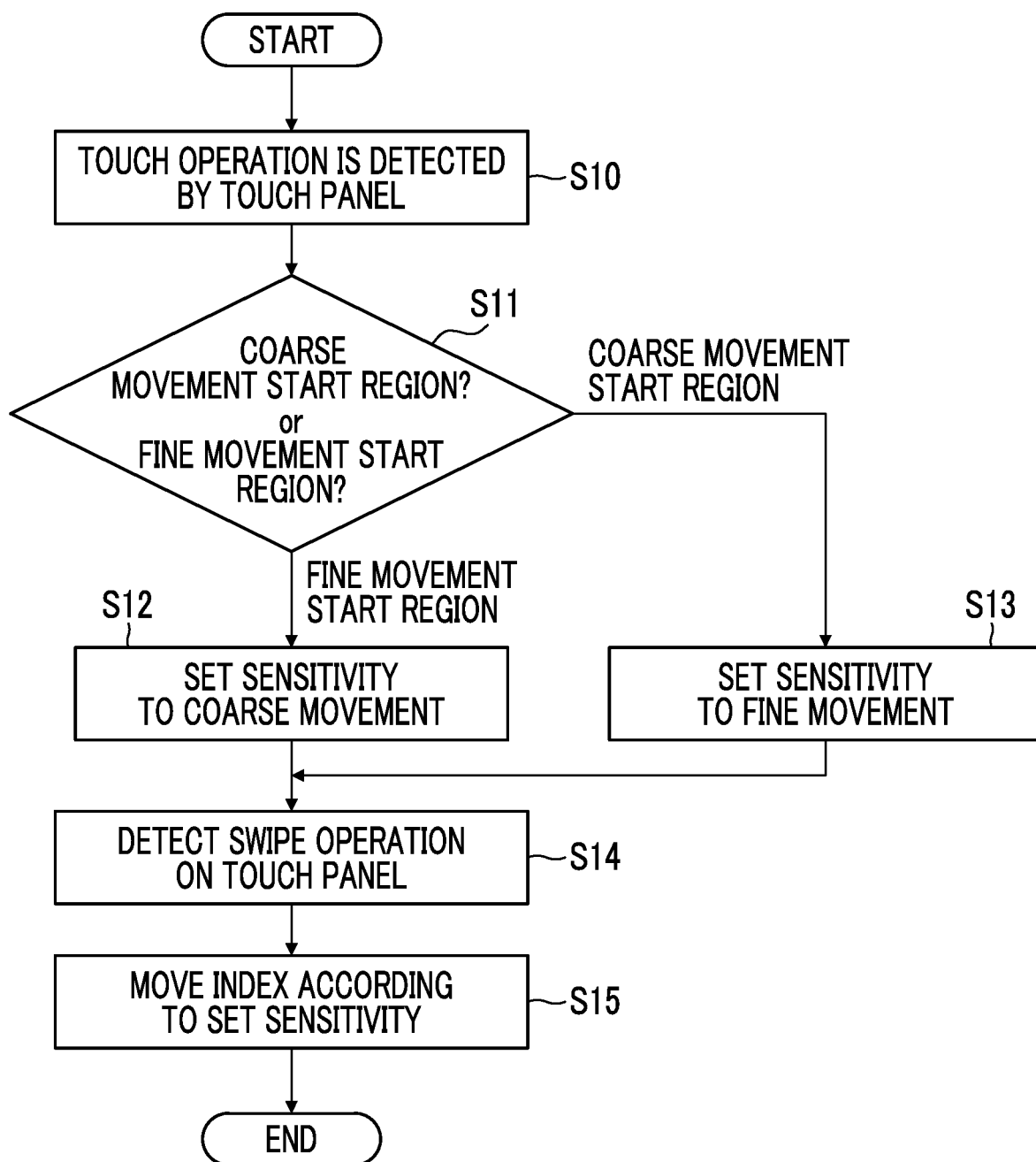
FIG. 10 is a flowchart showing an operation flow of an imaging apparatus.

FIG. 10 is a flowchart showing an operation flow of the imaging apparatus 10.

First, the touch operation of the user finger 120 is detected by the touch panel 31 of the imaging apparatus 10, and the region of the contact operation performed on the touch panel 31 is detected via the touch sensor input unit 49 (step S10). Then, the sensitivity setting unit 101 determines whether the region where the touch panel 31 has detected the contact operation is the coarse movement start region W1 or the fine movement start region W2 (step S11). In a case where the contact operation is detected in the coarse movement start region W1, the sensitivity setting unit 101 sets the sensitivity to coarse movement (step S12: sensitivity setting step). On the other hand, in a case where the contact operation is detected in the fine movement start region W2, the sensitivity setting unit 101 sets the sensitivity to fine movement (step S13: sensitivity setting step). After that, the movement control unit 103 detects the swipe operation on the touch panel (step S14), and moves the index according to the set sensitivity in conjunction with the swipe operation (step S15: movement control step).

In the above-described embodiment, the hardware structure of the processing unit that executes various processing is the following various processors. The various processors include a central processing unit (CPU) that is a general-purpose processor functioning as various processing units by executing software (program), a programmable logic device (PLD) such as a field programmable gate array (FPGA) that is a processor of which a circuit configuration can be changed after manufacturing, a dedicated electric circuit such as an application specific integrated circuit (ASIC) that is a processor having a circuit configuration dedicatedly designed to execute specific processing, and the like.

One processing unit may be configured with one of the various processors or may be configured with two or more processors of the same type or different types (for example, a plurality of FPGAs or a combination of a CPU and an FPGA). In addition, a plurality of processing units may be configured with one processor. As an example of configuring a plurality of processing units with one processor, a first aspect is configuring one processor with a combination of one or more CPUs and software and implementing functions of a plurality of processing units by the processor as represented by a computer such as a client and a server. A second aspect is using a processor that implements the function of the whole system including a plurality of processing units by one integrated circuit (IC) chip as represented by a system on chip (SoC) and the like. In this way, various processing units are configured by using one or more of the various processors as a hardware structure.

Furthermore, the hardware structure of the various processors is more specifically an electric circuit (circuitry) in which circuit elements such as semiconductor elements are combined.

Each configuration and each function described above can be appropriately implemented by any hardware, software, or a combination of both hardware and software. For example, the present invention can also be applied to a program that causes a computer to execute the processing steps (processing procedure) described above, a computer-readable recording medium (non-transitory recording medium) on which the program is recorded, or a computer on which the program can be installed.

Second Embodiment

Next, the second embodiment will be described. In the present embodiment, the touch panel 31 is provided with a non-sensitive region (third region) W3 in addition to the coarse movement start region W1 and the fine movement start region W2.

Figure 11:
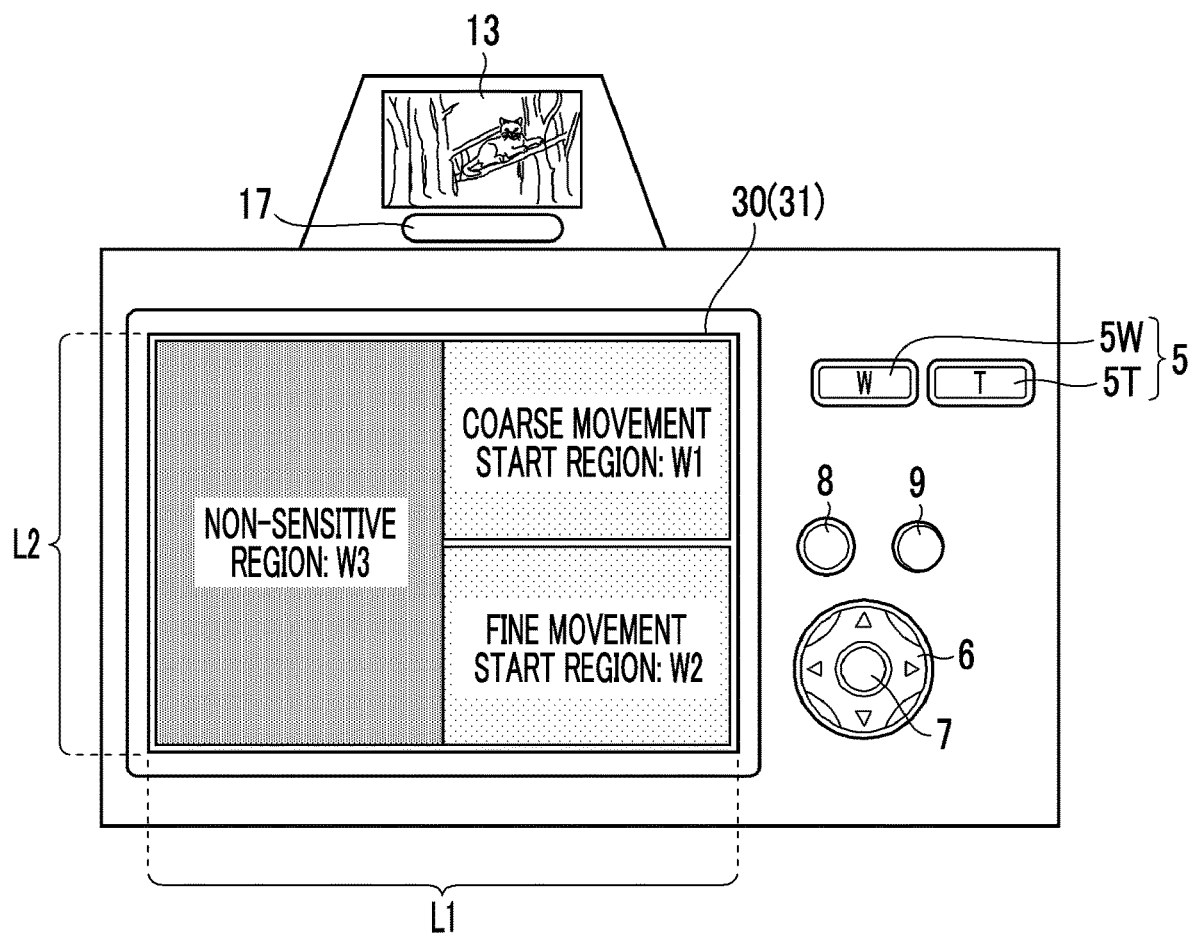
FIG. 11 is a diagram showing a region set on a touch panel.

FIG. 11 is a diagram showing a region set on the touch panel 31. The parts already described in FIG. 5 are designated by the same reference signs and the description thereof will be omitted.

The touch panel 31 is provided with a coarse movement start region W1, a fine movement start region W2, and a non-sensitive region W3. The non-sensitive region W3 is a region in which the swipe operation is not detected. By providing the non-sensitive region W3, it is possible to suppress the index from moving accidentally even in a case where the user unintentionally touches the touch panel 31.

FIG. 11 shows a disposition of the non-sensitive region W3 suitable for the user looking into the finder 11 with the right eye. In FIG. 11, in a case where the user looks into the finder 11 with the right eye, the non-sensitive region W3 is a region where a part of the face may come into contact. As a result, assuming that the user looks into the finder 11 with the right eye, even in a case where a part of the face unintentionally touches the touch panel 31, it is possible to suppress the index from moving accidentally.

Third Embodiment

Next, the third embodiment will be described. In the present embodiment, the coarse movement start region W1, the fine movement start region W2, and the non-sensitive region W3 are set on the basis of the posture of the imaging apparatus 10.

Figure 12:
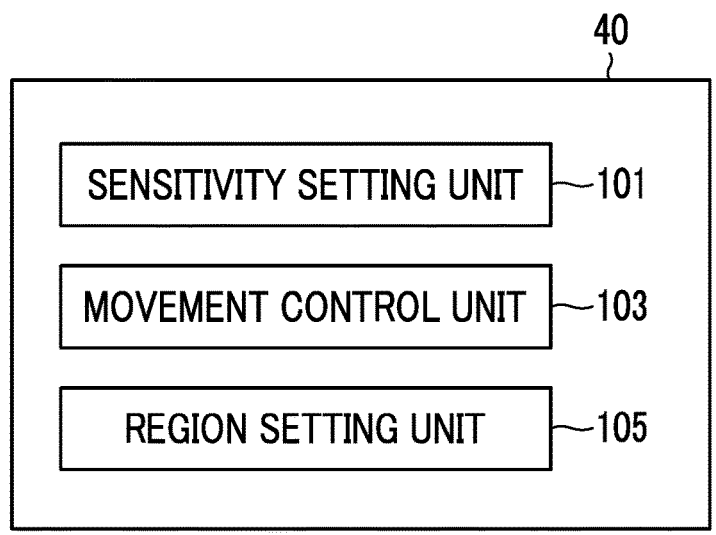
FIG. 12 is a block diagram showing an example of the main functional configuration of a CPU.

FIG. 12 is a block diagram showing an example of the main functional configuration of the CPU 40 of the embodiment. The parts already described in FIG. 4 are designated by the same reference signs and the description thereof will be omitted.

The region setting unit 105 sets the coarse movement start region W1 and the fine movement start region W2 on the touch panel 31 on the basis of the detection result of the posture sensor 51. Specifically, the posture sensor 51 detects whether the imaging apparatus 10 is in the horizontal position or the vertical position, and the region setting unit 105 changes the disposition of the coarse movement start region W1 and the fine movement start region W2 depending on whether the imaging apparatus 10 is in the horizontal position or the vertical position. In addition, the region setting unit 105 changes the disposition of the non-sensitive region W3 in accordance with the change of the disposition of the coarse movement start region W1 and the fine movement start region W2.

Figure 13:
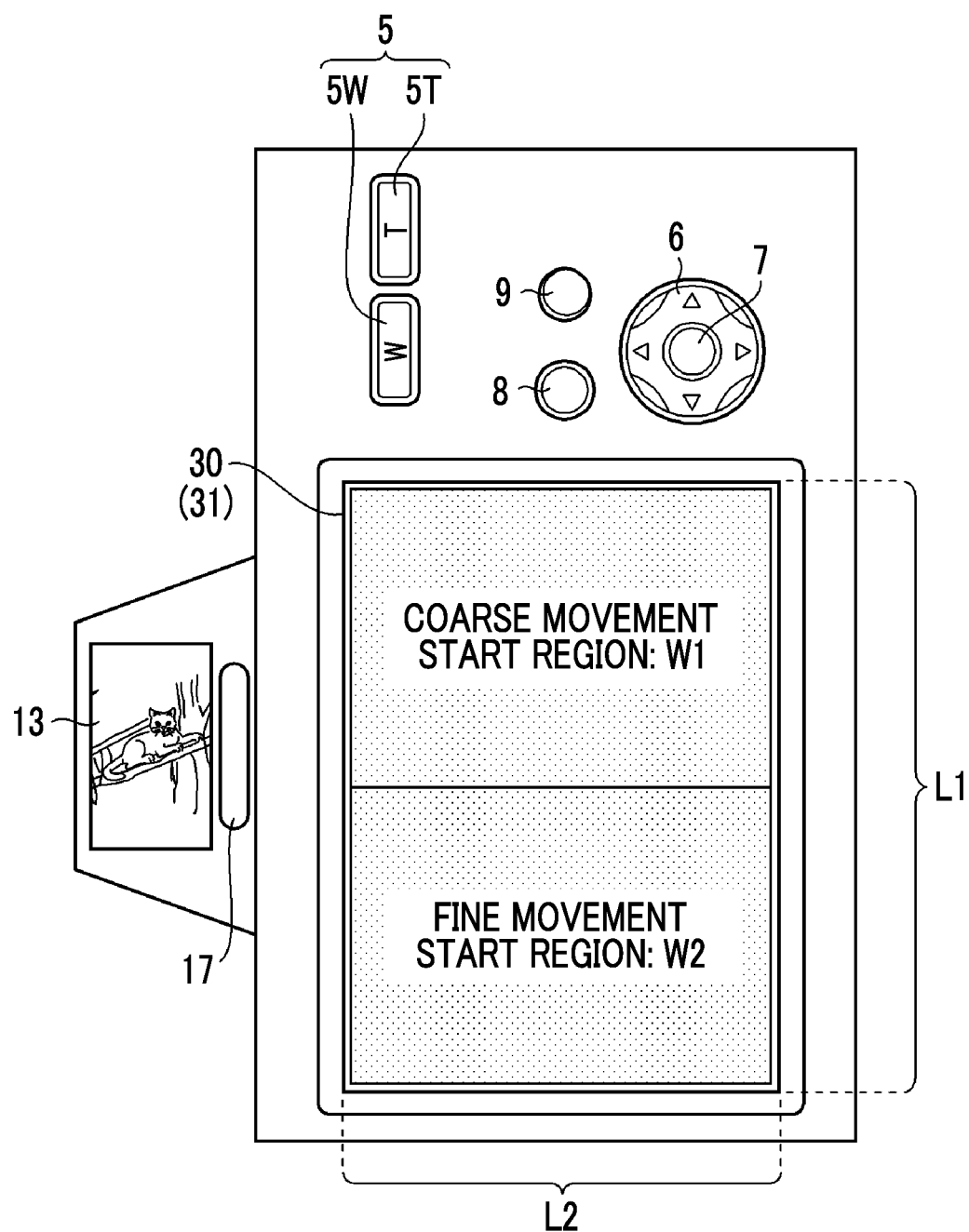
FIG. 13 is a diagram showing an example of a region setting in a case where an imaging apparatus is in a vertical position.

FIG. 13 is a diagram showing an example of region setting in a case where the imaging apparatus 10 is in the vertical position.

The example shown in FIG. 13 is an example in which the imaging apparatus 10 is in the vertical position and the finder 11 is on the left side in the imaging direction. In this case, the coarse movement start region W1 and the fine movement start region W2 are set such that a long side L1 of the touch panel 31 is divided into two equal parts. By setting the coarse movement start region W1 and the fine movement start region W2 in this way, the user can easily perform the contact operation and the swipe operation in the coarse movement start region W1 and the fine movement start region W2 even in a case where the imaging apparatus 10 is in the vertical position.

Figure 14:
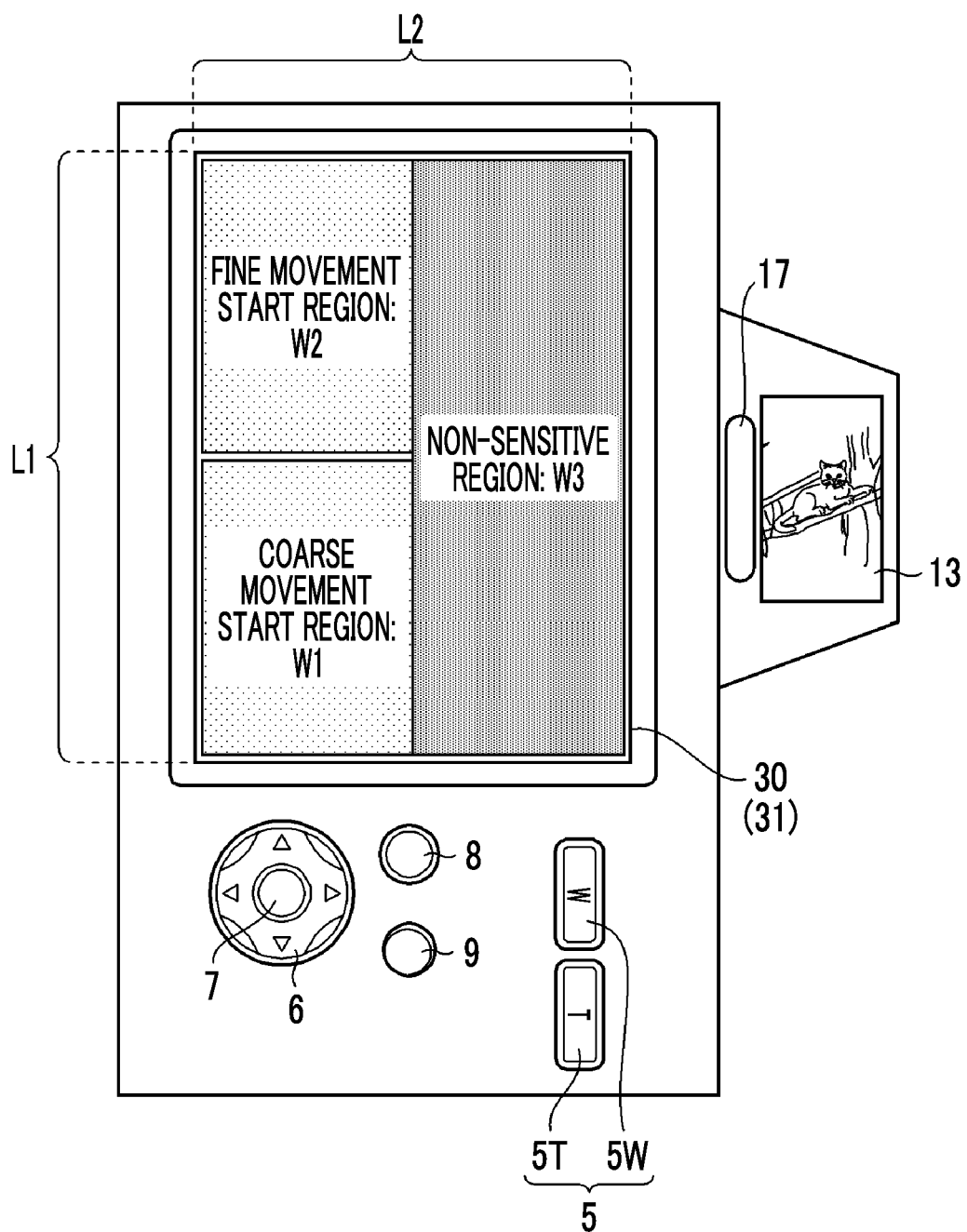
FIG. 14 is a diagram showing an example of a region setting in a case where an imaging apparatus is in a vertical position.

FIG. 14 is a diagram showing an example of region setting in a case where the imaging apparatus 10 is in the vertical position.

The example shown in FIG. 14 is an example in which the imaging apparatus 10 is in the vertical position and the finder 11 is on the right side in the imaging direction. In this case, the coarse movement start region W1 and the fine movement start region W2 are set in such a manner that the short side L2 of the touch panel 31 is divided into two equal parts and the L2 is divided into two equal parts along the long side L1 on the left side in the imaging direction. In addition, the non-sensitive region W3 is set on the right side (finder side) where the short side L2 is divided into two equal parts. By setting the coarse movement start region W1, the fine movement start region W2, and the non-sensitive region W3 in this way, the user can easily perform the swipe operation in the coarse movement start region W1 and the fine movement start region W2 even in a case where the imaging apparatus 10 is in the vertical position. Further, by providing the non-sensitive region W3 at the position shown in the Figs, it is possible to suppress the index from moving accidentally by touching part of the face with the touch panel 31 in a case where the user looks into the finder 11.

Figure 15:
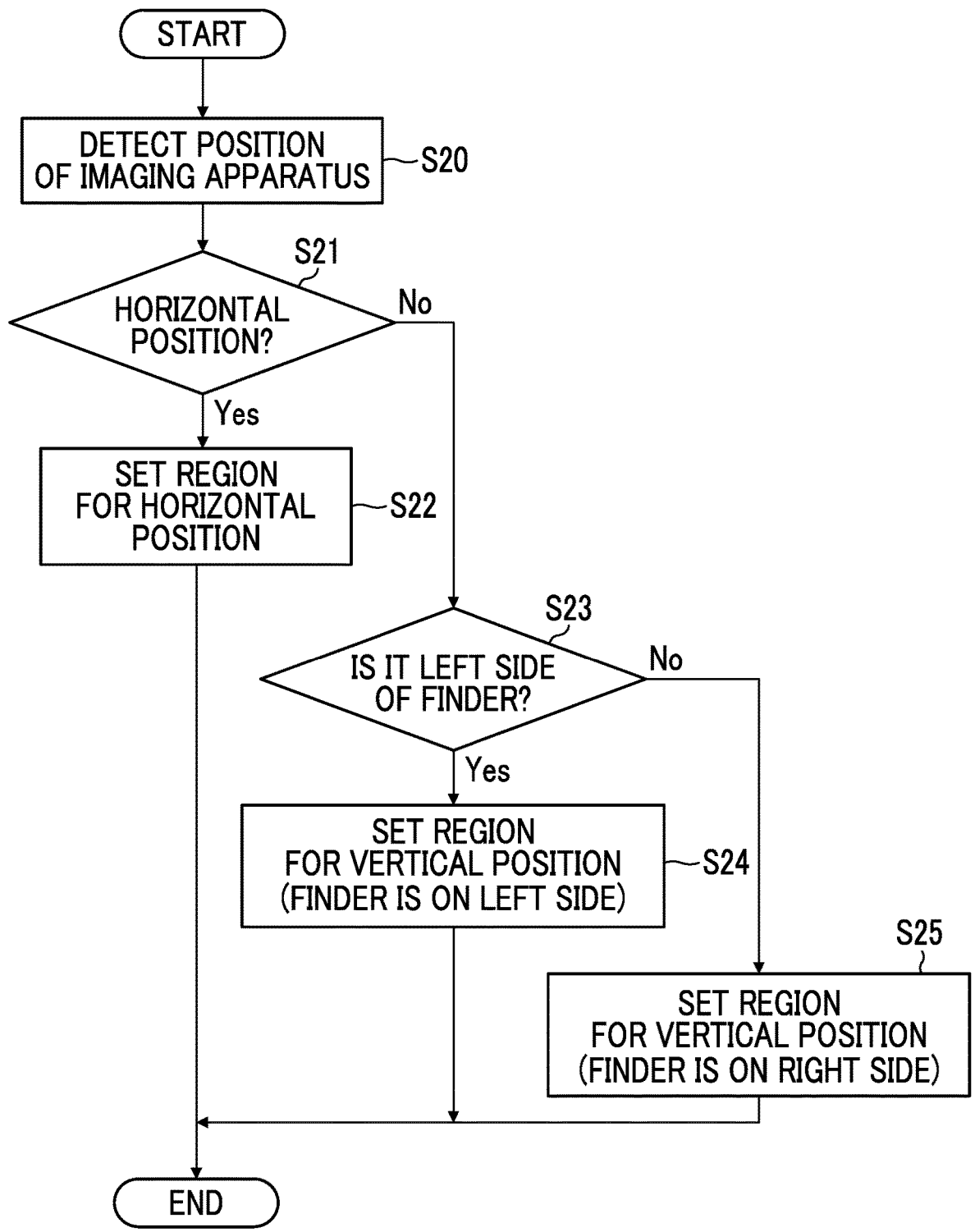
FIG. 15 is a flowchart showing a flow of region setting of a coarse movement start region, a fine movement start region, and a non-sensitive region according to a vertical position and a horizontal position of an imaging apparatus.

FIG. 15 is a flowchart showing a flow of region setting of the coarse movement start region W1, the fine movement start region W2, and the non-sensitive region W3 according to the vertical position and the horizontal position of the imaging apparatus 10.

First, the position of the imaging apparatus 10 is detected by the posture sensor 51 (step S20). Then, the region setting unit 105 determines whether or not the imaging apparatus 10 is in the horizontal position (step S21). In a case where the imaging apparatus 10 is in the horizontal position, the coarse movement start region W1 and the fine movement start region W2 for the horizontal position are set (step S22). Examples of the region setting for the horizontal position include the examples shown in FIGS. 5 and 11.

On the other hand, in a case where the imaging apparatus 10 is not in the horizontal position but in the vertical position, the region setting unit 105 determines whether or not the finder 11 is in the vertical position on the left side in the imaging direction on the basis of the detection result of the posture sensor 51 (step S23). In a case of determining that the finder 11 is on the left side, the region setting unit 105 sets the coarse movement start region W1 and the fine movement start region W2 for the vertical position (the finder 11 is on the left side) (step S24). The example shown in FIG. 13 is an example of setting the coarse movement start region W1 and the fine movement start region W2 for the vertical position (the finder 11 is on the left side). In addition, in a case of determining that the finder 11 is on the right side, the region setting unit 105 sets the coarse movement start region W1 and the fine movement start region W2 for the vertical position (the finder 11 is on the right side) (step S25). The example shown in FIG. 14 is an example of setting the coarse movement start region W1 and the fine movement start region W2 for the vertical position (the finder 11 is on the right side).

As described above, the user can perform the swipe operation with respect to the touch panel 31 without difficulty by setting the coarse movement start region W1, the fine movement start region W2, and the non-sensitive region W3 on the basis of the detection result of the posture sensor 51.

Fourth Embodiment

Next, the fourth embodiment will be described. In the present embodiment, in a case where the user performs the return operation by the swipe operation, the region setting is changed.

Figure 16:
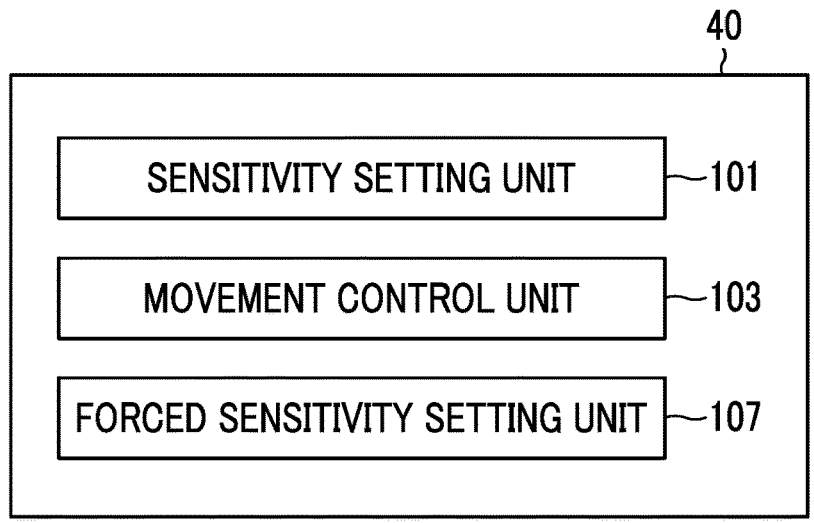
FIG. 16 is a block diagram showing an example of the main functional configuration of a CPU.

FIG. 16 is a block diagram showing an example of the main functional configuration of the CPU 40 of the embodiment. The parts already described in FIG. 4 are designated by the same reference signs and the description thereof will be omitted.

The CPU 40 of the embodiment comprises the sensitivity setting unit 101, the movement control unit 103, and a forced sensitivity setting unit 107. The parts already described in FIG. 4 are designated by the same reference signs and the description thereof will be omitted.

The forced sensitivity setting unit 107 forcibly sets the sensitivity. Here, in a case where the sensitivity is forcibly set, the preset reception setting of the coarse movement sensitivity and the fine movement sensitivity is forcibly switched. For example, the forced sensitivity setting unit 107 forcibly switches the preset reception setting of the coarse movement sensitivity and the fine movement sensitivity by switching the coarse movement start region W1 and the fine movement start region W2. The switching of the reception setting is, for example, switching the coarse movement start region W1 and the fine movement start region W2.

The forced sensitivity setting unit 107 forcibly switches the reception setting of the first sensitivity and the reception setting of the second sensitivity in a case where a distance between the start point of the swipe operation (point of contact operation) and the end point of the swipe operation is equal to or less than the threshold value. This is because, in a case where the distance between the start point and the end point is equal to or less than the threshold value, the forced sensitivity setting unit 107 determines that the user has performed the return operation. It should be noted that the start point and the end point of the swipe operation are detected by the touch panel 31.

In addition, the forced sensitivity setting unit 107 may change the threshold value for determining the return operation according to the sensitivity. For example, the forced sensitivity setting unit 107 switches to the fine movement sensitivity in a case where the distance between the start point and the end point is equal to or less than the first threshold value assuming that the index is moving with the coarse movement sensitivity. Further, for example, the forced sensitivity setting unit 107 forcibly switches to the coarse movement sensitivity in a case where the distance between the start point and the end point is equal to or less than the second threshold value assuming that the index is moving with the fine movement sensitivity. It should be noted that the first threshold value is set to be larger than the second threshold value. This is because the index often moves a long distance in a case of the coarse movement sensitivity, and often moves a short distance in a case of the fine movement sensitivity.

Figure 17:
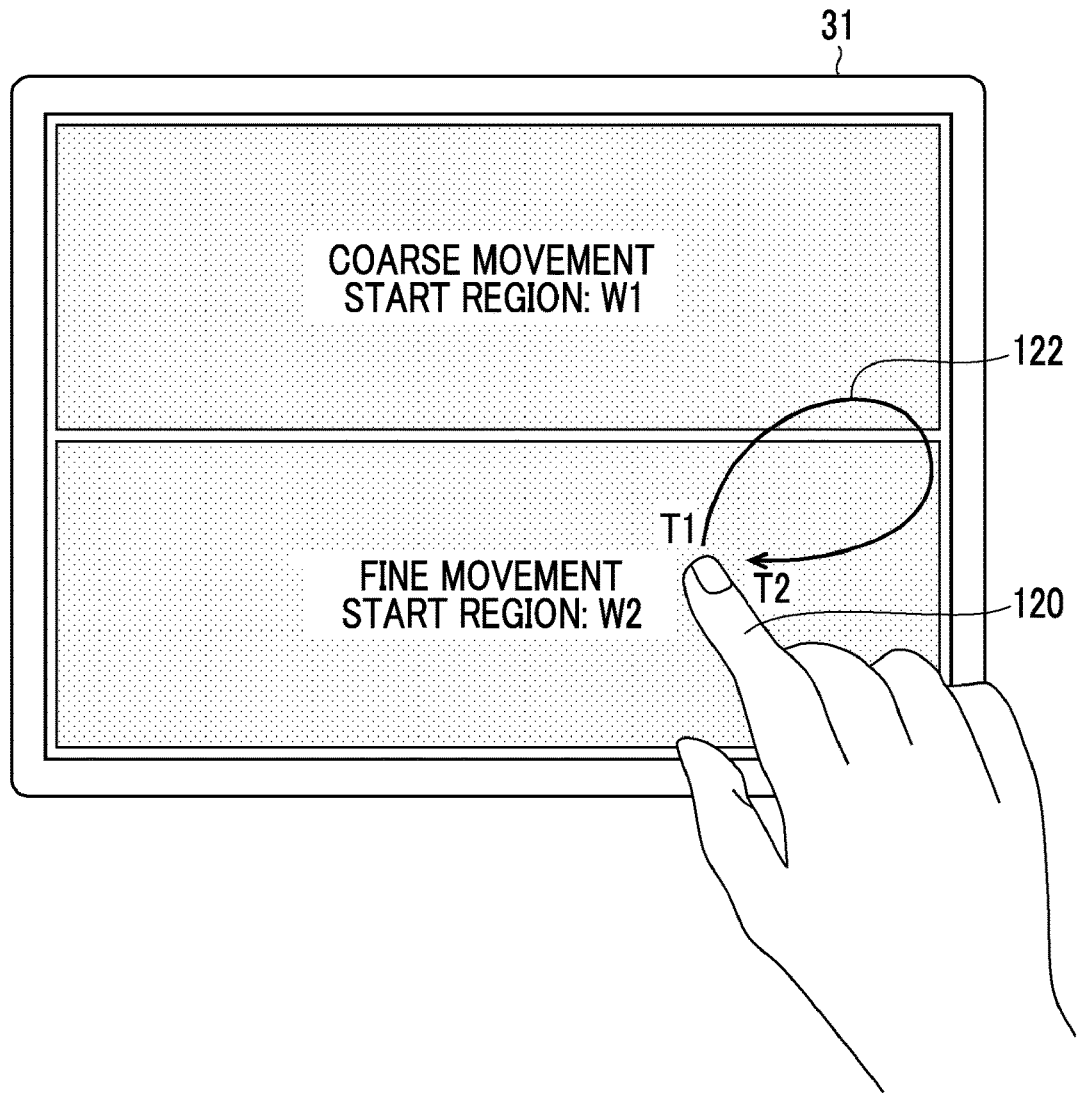
FIG. 17 is a diagram showing a swipe operation on a touch panel.
Figure 18:
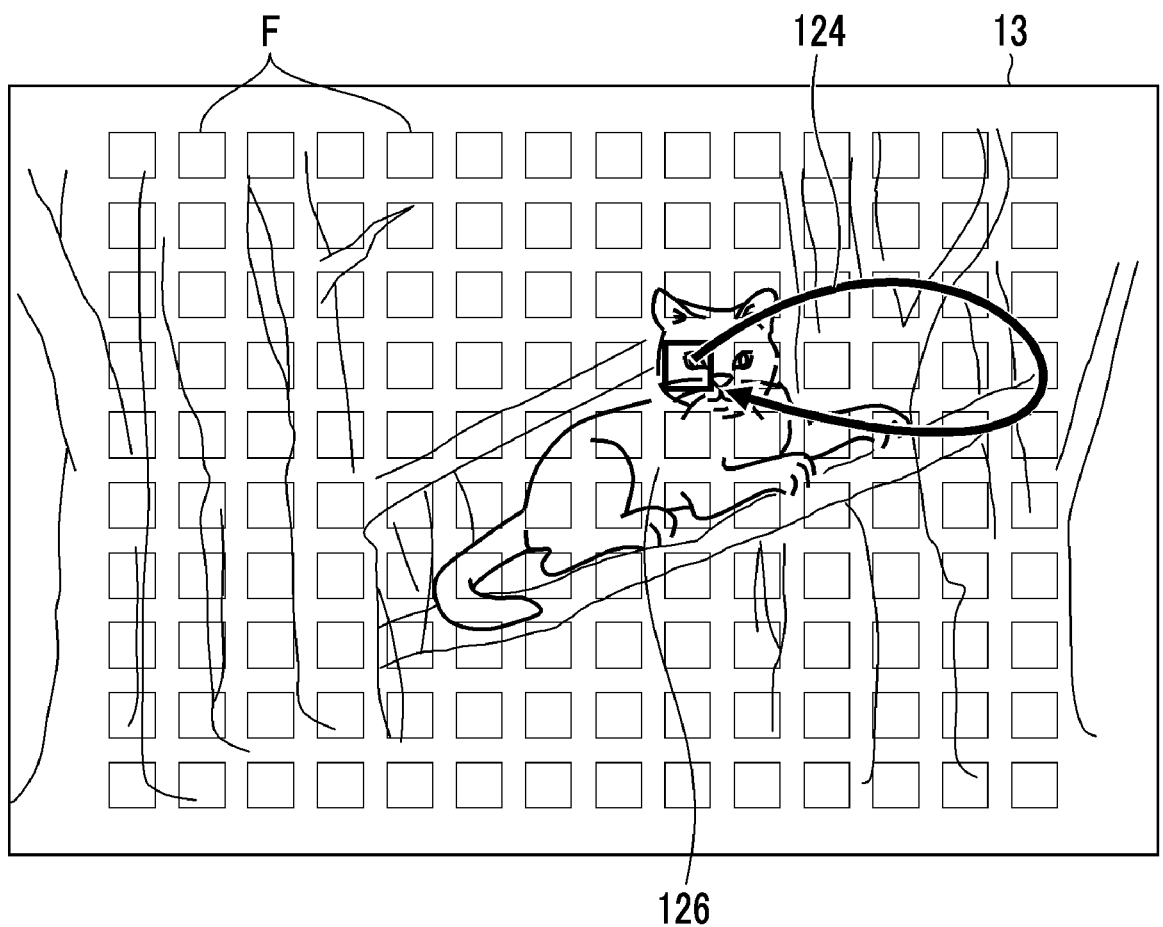
FIG. 18 is a diagram showing movement of a focus area on a finder monitor.

FIGS. 17 and 18 are diagrams showing an example of the return operation. FIG. 17 is a diagram showing the swipe operation on the touch panel 31. In addition, FIG. 18 is a diagram showing movement of the focus area F on the finder monitor 13 in conjunction with the swipe operation shown in FIG. 17. It should be noted that a start point (start coordinate) T1 in the contact operation starts in the fine movement start region W2, the finger 120 performs the swipe operation along the arrow 122, and the swipe operation ends at an end point (end coordinate) T2. In conjunction with this return operation, as shown in FIG. 18, a position of the focus area F, which is an example of the index, moves along an arrow 124 in the finder monitor 13. Since the distance between the start point T1 and the end point T2 is equal to or less than the threshold value, the forced sensitivity setting unit 107 determines that the return operation has been performed. Then, the forced sensitivity setting unit 107 changes the regions of the coarse movement start region W1 and the fine movement start region W2 shown in FIG. 17. That is, after the return operation is performed, the index moves according to the coarse movement sensitivity.

Next, the flow of detecting a return operation and changing reception setting will be described.

Figure 19:
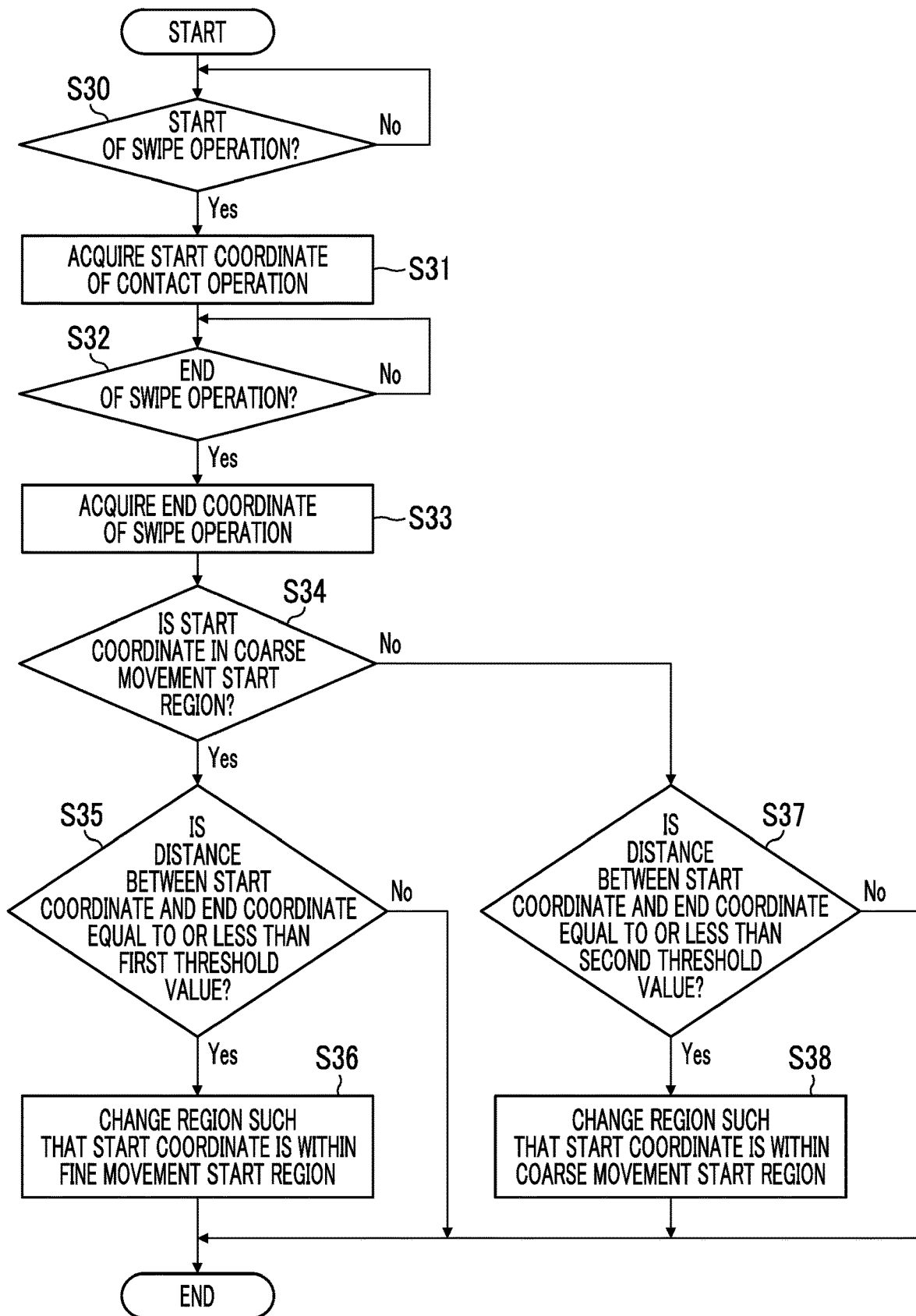
FIG. 19 is a flowchart showing a flow of detecting a return operation and changing reception setting.

FIG. 19 is a flowchart showing a flow of detecting the return operation and changing the reception setting.

First, the touch panel 31 detects a contact operation that is the start of the swipe operation (step S30). In a case where the touch panel 31 detects the contact operation, the touch panel 31 acquires a start coordinate T1 of the contact operation (step S31). Then, the touch panel 31 detects the end of the swipe operation (step S32). Then, an end coordinate T2 of the swipe operation is acquired (step S33).

Then, the forced sensitivity setting unit 107 determines whether or not the start coordinate T1 is the coarse movement start region W1 (step S34). Then, in a case where the start coordinate T1 of the swipe operation is the coarse movement start region W1, the forced sensitivity setting unit 107 determines whether or not the distance between the start coordinate T1 and the end coordinate T2 is equal to or less than the first threshold value (step S35). In a case where the distance between the start coordinate T1 and the end coordinate T2 is equal to or less than the first threshold value, the forced sensitivity setting unit 107 changes the region such that the start coordinate T1 is within the fine movement start region (step S36). In a case where the distance between the start coordinate T1 and the end coordinate T2 is larger than the first threshold value, the forced sensitivity setting unit 107 does not change the region.

On the other hand, in a case where the start coordinate T1 of the swipe operation is the coarse movement start region W1, the forced sensitivity setting unit 107 determines whether or not the distance between the start coordinate T1 and the end coordinate T2 is equal to or less than the second threshold value (step S37). In a case where the distance between the start coordinate T1 and the end coordinate T2 is equal to or less than the second threshold value, the forced sensitivity setting unit 107 changes the region such that the start coordinate T1 of the swipe operation is within the coarse movement start region (step S38). In a case where the distance between the start coordinate T1 and the end coordinate T2 is larger than the second threshold value, the forced sensitivity setting unit 107 does not change the region.

In this way, the forced sensitivity setting unit 107 determines the return operation using the threshold value and forcibly changes the sensitivity, so that the user can easily move the index with different sensitivity.

<Other>

In the above description, an example in which the coarse movement start region W1 and the fine movement start region W2 are provided in the region of the touch panel 31 has been described. However, the sensitivity setting unit 101 can set the coarse movement sensitivity and the fine movement sensitivity according to other aspects.

The sensitivity setting unit 101 may set the movement sensitivity of the index by pressing pressure the contact operation. The sensitivity setting unit 101 sets the first sensitivity in a case where the contact operation is performed by the first pressing pressure, and sets the second sensitivity in a case where the contact operation is performed by the second pressing pressure.

In addition, the sensitivity setting unit 101 may set the movement sensitivity of the index according to the contact area. The sensitivity setting unit 101 sets the first sensitivity in a case where the contact operation is performed by the first contact area, and sets the second sensitivity in a case where the contact operation is performed by the second contact area.

In addition, the sensitivity setting unit 101 may set the sensitivity according to the number of fingers 120 touching the touch panel 31. The sensitivity setting unit 101 sets the first sensitivity in a case where the contact operation is performed by the first number of fingers 120, and sets the second sensitivity in a case where the contact operation is performed by the second number of fingers 120.

In the above description, the index has been described with respect to the index of the focus area F, but the index is not limited to this. The index is not particularly limited as long as it indicates the imaging condition or the image processing condition according to a superimposed and displayed position. For example, the present invention is also applied to the index showing the amount of white balance correction.

Figure 20:
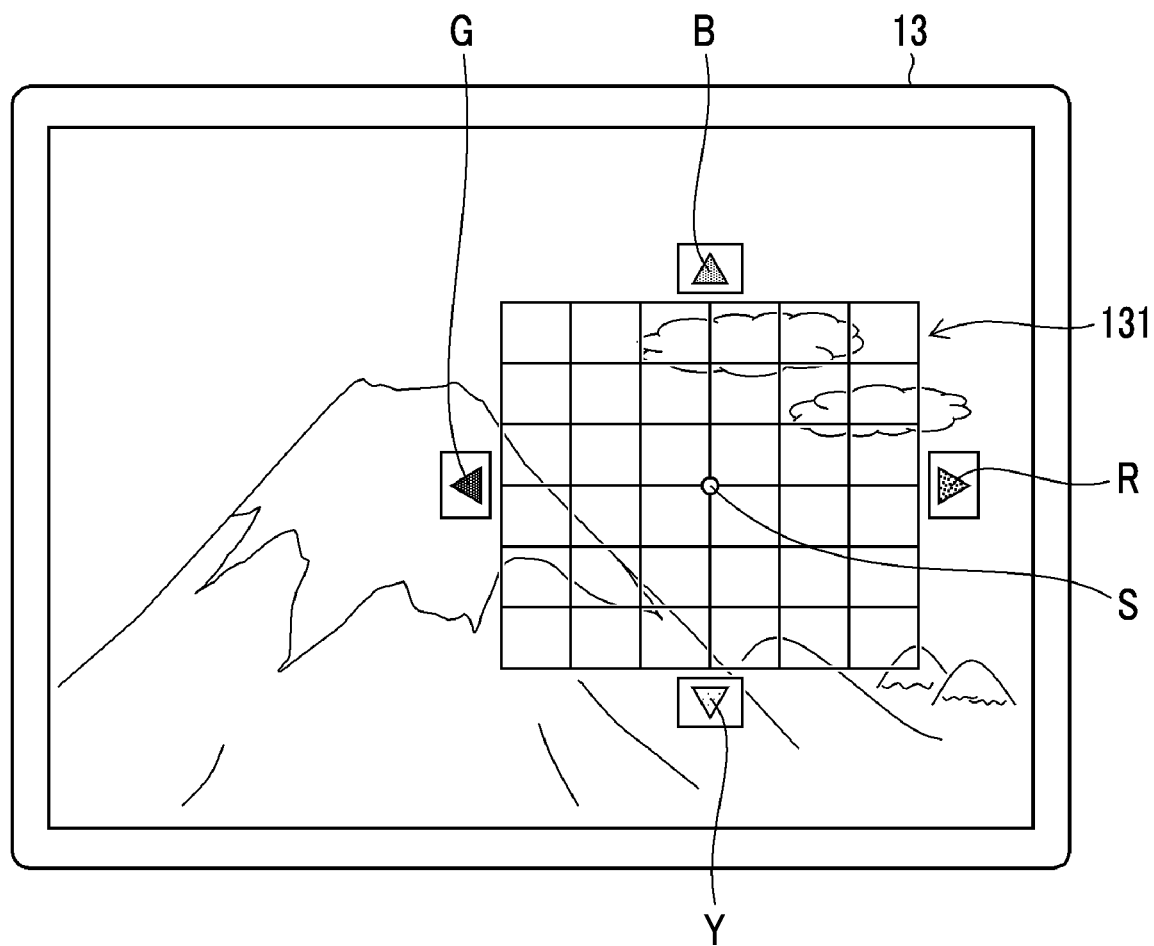
FIG. 20 is a diagram showing that a white balance shift image is displayed on a finder monitor.

FIG. 20 is a diagram showing that a white balance shift image is displayed by being superimposed on the live view image displayed on the finder monitor 13.

In the white balance shift image (WB shift image) 131 superimposed and displayed on the live view image, each of a red axis (R), a blue axis (B), a green axis (G), and a yellow axis (Y) is shown, and the white balance shift amount is adjusted by moving an index S. Specifically, by moving the index S, the white balance shift amount is adjusted, and the white balance shift amount is reflected in the live view image, so that the user can perform the intended white balance adjustment. In this case, in the WB shift image, the index can be moved quickly and accurately on the WB shift image by moving the index with the fine movement sensitivity and the coarse movement sensitivity as intended by the user.

While the examples of the present invention are described thus far, the present invention is not limited to the embodiments and can be subjected to various deformations without departing from the spirit of the present invention.

EXPLANATION OF REFERENCES

1: strobe
2: shutter button
3: power/mode switch
4: mode dial
5: zoom button
5T: tele button
5W: wide button
6: cross button
7: MENU/OK button
8: play button
9: BACK button
10: imaging apparatus
11: finder
12: imaging lens
13: finder monitor
14: stop
15: mechanical shutter
16: imaging element
17: eye sensor
22: image input controller
24: image processing unit
26: compression and expansion processing unit
28: video encoder
30: rear monitor
31: touch panel
32: sensor driving unit
33: shutter driving unit
34: stop driving unit
36: lens driving unit
38: operation unit
40: CPU
42: AF processing unit
44: AE detection unit
47: ROM
48: memory
49: touch sensor input unit
51: posture sensor
52: media controller
54: memory card
101: sensitivity setting unit
103: movement control unit
105: region setting unit
107: forced sensitivity setting unit
Steps S10 to S15: processes of imaging method
Steps S20 to S25: processes of region setting
Steps S30 to S38: processes of detecting return operation and changing reception setting

What is claimed is:

1. An imaging apparatus comprising:
a finder configured to display a live view image and an index superimposed and displayed on the live view image, the finder displaying the index for indicating an imaging condition or an image processing condition according to a superimposed and displayed position;
a touch panel configured to receive a swipe operation for moving the index; and
at least one processor configured to:
set a first sensitivity for coarsely moving the index by the swipe operation or a second sensitivity for finely moving the index by the swipe operation, by detecting a contact operation to the touch panel in the swipe operation; and
move the index on a basis of the swipe operation on the touch panel, and either one of the first sensitivity and the second sensitivity.

2. The imaging apparatus according to claim 1, wherein the touch panel has a first region and a second region, and
the at least one processor sets a sensitivity to the first sensitivity in a case where the contact operation is performed in the first region, and sets the sensitivity to the second sensitivity in a case where the contact operation is performed in the second region.

3. The imaging apparatus according to claim 2, further comprising a posture sensor configured to detect a posture of the imaging apparatus,
wherein the at least one processor sets the first region and the second region on the basis of a detection result of the posture sensor.

4. The imaging apparatus according to claim 2,
wherein the touch panel further has a third region that is a non-sensitive region where the swipe operation is not detected.

5. The imaging apparatus according to claim 1,
wherein the at least one processor sets a sensitivity to the first sensitivity in a case where the contact operation is performed with a first pressing pressure, and sets a sensitivity to the second sensitivity in a case where the contact operation is performed with a second pressing pressure.

6. The imaging apparatus according to claim 1,
wherein the at least one processor sets a sensitivity to the first sensitivity in a case where the contact operation is performed with a first contact area, and sets a sensitivity to the second sensitivity in a case where the contact operation is performed with a second contact area.

7. The imaging apparatus according to claim 1,
wherein the at least one processor sets a sensitivity to the first sensitivity in a case where the contact operation is performed with a first number of fingers, and sets a sensitivity to the second sensitivity in a case where the contact operation is performed with a second number of fingers.

8. The imaging apparatus according to claim 1,
wherein the touch panel detects a start point and an end point of the swipe operation, and
the at least one processor forcibly switches a reception setting of the first sensitivity and a reception setting of the second sensitivity in a case where a distance between the start point and the end point is a threshold value or less.

9. The imaging apparatus according to claim 8,
wherein the at least one processor forcibly switches the first sensitivity to the second sensitivity in a case where the distance between the start point and the end point is a first threshold value or less in a movement of the index at the first sensitivity, and forcibly switches the second sensitivity to the first sensitivity in a case where the distance between the start point and the end point is a second threshold value or less in a movement of the index at the second sensitivity.

10. The imaging apparatus according to claim 1,
wherein the index shows a position of a focus area.

11. The imaging apparatus according to claim 1,
wherein the index shows an amount of white balance correction.

12. An imaging method of an imaging apparatus having a finder that displays a live view image and an index superimposed and displayed on the live view image, the finder displaying the index for indicating an imaging condition or an image processing condition according to a superimposed and displayed position, and a touch panel that receives a swipe operation for moving the index, the imaging method comprising:
setting a first sensitivity for coarsely moving the index by the swipe operation or a second sensitivity for finely moving the index by the swipe operation, by detecting a contact operation to the touch panel in the swipe operation; and
moving the index on a basis of the swipe operation on the touch panel, and either one of the first sensitivity and the second sensitivity.

13. A non-transitory computer-readable recording medium for causing a computer to realize an imaging process of an imaging apparatus in a case where an instruction stored in a recording medium is read by the computer, the imaging apparatus having a finder that displays a live view image and an index superimposed and displayed on the live view image, the finder displaying the index for indicating an imaging condition or an image processing condition according to a superimposed and displayed position, and a touch panel that receives a swipe operation for moving the index, the imaging process comprising:
setting a first sensitivity for coarsely moving the index by the swipe operation or a second sensitivity for finely moving the index by the swipe operation, by detecting a contact operation to the touch panel in the swipe operation; and
moving the index on a basis of the swipe operation on the touch panel, and either one of the first sensitivity and the second sensitivity.

\* \* \* \* \*